US012677982B2

(12) United States Patent
Chang et al.

(10) Patent No.: US 12,677,982 B2
(45) Date of Patent: Jul. 14, 2026

(54) AUTOMATED BEVERAGE PREPARATION APPARATUS CAPABLE OF PREPARING LAYERED DRINK

(71) Applicant: Botrista, Inc., Dover, DE (US)

(72) Inventors: Yung-Hsiang Chang, Taipei City (TW); Wu-Chou Kuo, Taipei City (TW); Kuan-Chang Pan, Taipei City (TW); Kai-Chung Hsu, Taipei City (TW); Jhih-Sheng Jhang, Taipei City (TW)

(73) Assignee: Botrista, Inc., Dover, DE (US)

( * ) Notice: Subject to any disclaimer, the term of this patent is extended or adjusted under 35 U.S.C. 154(b) by 783 days.

(21) Appl. No.: 18/099,157

(22) Filed: Jan. 19, 2023

(65) Prior Publication Data

US 2024/0164569 A1 May 23, 2024

Related U.S. Application Data

(60) Provisional application No. 63/427,193, filed on Nov. 22, 2022.

(51) Int. Cl.
| | |
|---|---|
| *A47J 31/44* | (2006.01) |
| *A47J 31/40* | (2006.01) |
| *A47J 31/41* | (2006.01) |
| *A47J 31/46* | (2006.01) |

(Continued)

(52) U.S. Cl.
CPC ......... *A47J 31/4496* (2013.01); *A47J 31/402* (2013.01); *A47J 31/41* (2013.01);

(Continued)

(58) Field of Classification Search
CPC .. A47J 31/00; A47J 31/41; A47J 31/44; A47J 31/402; A47J 31/468; A47J 31/46;

(Continued)

(56) References Cited

U.S. PATENT DOCUMENTS

| | | | |
|---|---|---|---|
| 2011/0061420 A1* | 3/2011 | Anderson | B67D 1/0868 |
| | | | 222/1 |
| 2018/0103790 A1* | 4/2018 | Dubief | A47J 31/002 |
| 2022/0183499 A1 | 6/2022 | Brothers et al. | |

FOREIGN PATENT DOCUMENTS

| | | |
|---|---|---|
| CN | 106125792 A | 11/2016 |
| CN | 107529908 A | 1/2018 |

OTHER PUBLICATIONS

Machine Translation of Jiang (CN 106125792), performed on Nov. 15, 2025 (Year: 2016).*

(Continued)

*Primary Examiner* — Brian W Jennison
(74) *Attorney, Agent, or Firm* — Birch, Stewart, Kolasch & Birch, LLP

(57) ABSTRACT

An automated beverage preparation apparatus includes: multiple pumps for extracting multiple fluid materials stored in multiple material containers, and pushing the extracted fluid materials to move forward; a fluid output device coupled with the multiple pumps and arranged to operably dispense fluid materials to a beverage container; a user control interface arranged to operably generate a control command; a processing circuit arranged to operably generate a corresponding control signal according to the control command; and a pump control circuit arranged to operably control the multiple pumps according to the control signal. The pump control circuit conducts a layered drink making operation under control of the processing circuit to cause the fluid output device to dispense different fluid materials to the beverage container, so as to automatically form a layered drink/gradient drink having at least two color layers within the beverage container.

17 Claims, 19 Drawing Sheets

(51) Int. Cl.
| | |
|---|---|
| *A47J 31/52* | (2006.01) |
| *B67D 1/00* | (2006.01) |
| *B67D 1/12* | (2006.01) |

(52) U.S. Cl.
   CPC ............. *A47J 31/468* (2018.08); *A47J 31/52* (2013.01); *B67D 1/0017* (2013.01); *B67D 1/0037* (2013.01); *B67D 1/0041* (2013.01); *B67D 1/1275* (2013.01)

(58) Field of Classification Search
   CPC ..... A47J 31/4496; A47J 31/52; B67D 1/0017; B67D 1/0037; B67D 1/0041; B67D 1/0872; B67D 1/1218; B67D 1/1275
   See application file for complete search history.

(56) References Cited

OTHER PUBLICATIONS

Taiwanese Office Action and Search Report for Taiwanese Application No. 112109219, dated Aug. 12, 2025, with partial English translation.
Taiwanese Notice of Allowance for Taiwanese Application No. 112102444, dated Mar. 6, 2023, with an English translation.
Taiwanese Office Action and Search Report for Taiwanese Application No. 112102444, dated Feb. 16, 2023, with an English translation.
Flinn, Flinn Scientific, Density of Soft Drinks, 2016.
Pereira, Brazilian Applied Science Review, 2020.
US Office Action, dated Jan. 28, 2026, issued in U.S. Appl. No. 18/098,877.

* cited by examiner

100

100

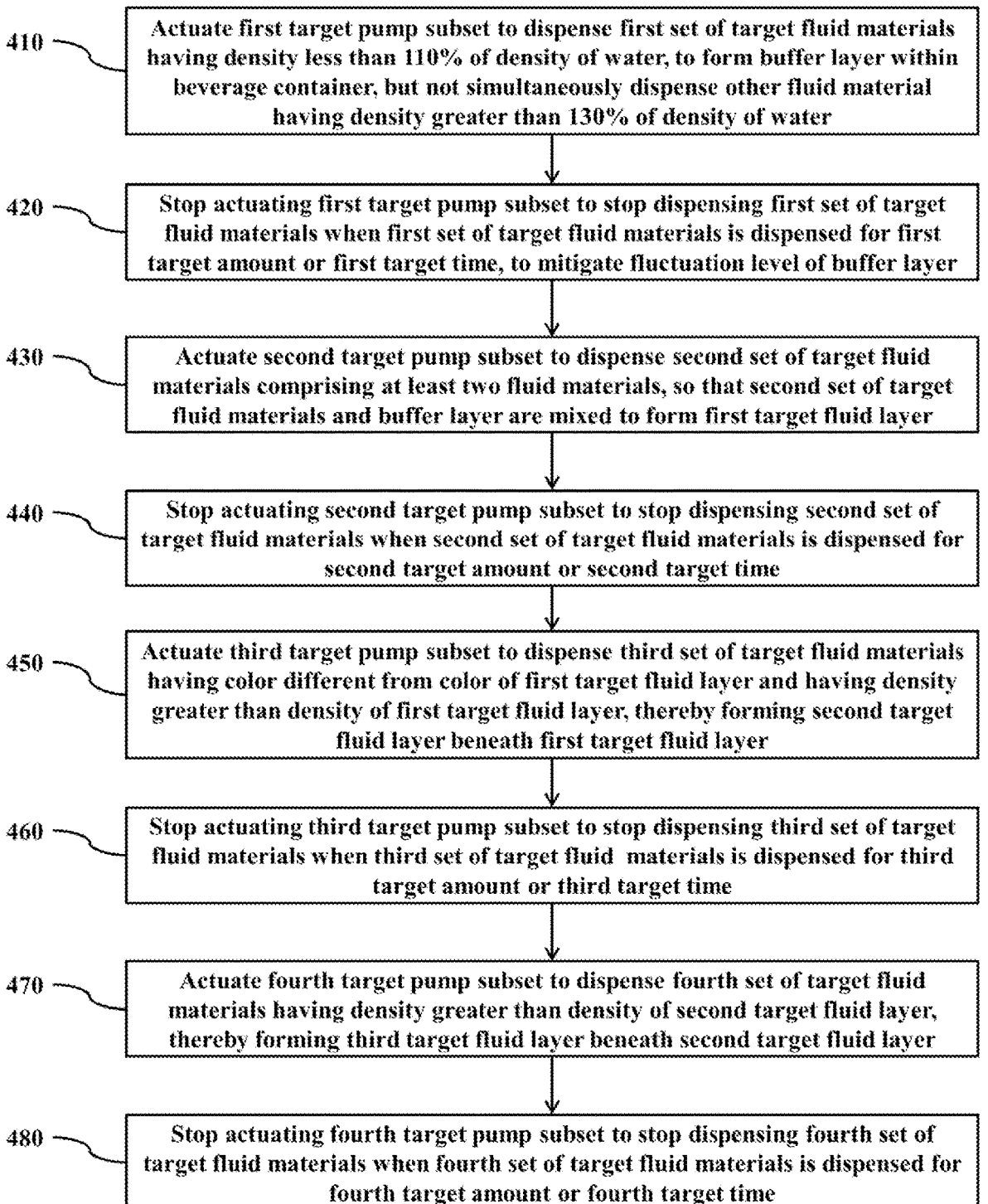

410 — Actuate first target pump subset to dispense first set of target fluid materials having density less than 110% of density of water, to form buffer layer within beverage container, but not simultaneously dispense other fluid material having density greater than 130% of density of water 420 — Stop actuating first target pump subset to stop dispensing first set of target fluid materials when first set of target fluid materials is dispensed for first target amount or first target time, to mitigate fluctuation level of buffer layer 430 — Actuate second target pump subset to dispense second set of target fluid materials comprising at least two fluid materials, so that second set of target fluid materials and buffer layer are mixed to form first target fluid layer 440 — Stop actuating second target pump subset to stop dispensing second set of target fluid materials when second set of target fluid materials is dispensed for second target amount or second target time 450 — Actuate third target pump subset to dispense third set of target fluid materials having color different from color of first target fluid layer and having density greater than density of first target fluid layer, thereby forming second target fluid layer beneath first target fluid layer 460 — Stop actuating third target pump subset to stop dispensing third set of target fluid materials when third set of target fluid materials is dispensed for third target amount or third target time 470 — Actuate fourth target pump subset to dispense fourth set of target fluid materials having density greater than density of second target fluid layer, thereby forming third target fluid layer beneath second target fluid layer 480 — Stop actuating fourth target pump subset to stop dispensing fourth set of target fluid materials when fourth set of target fluid materials is dispensed for fourth target amount or fourth target time

FIG. 4

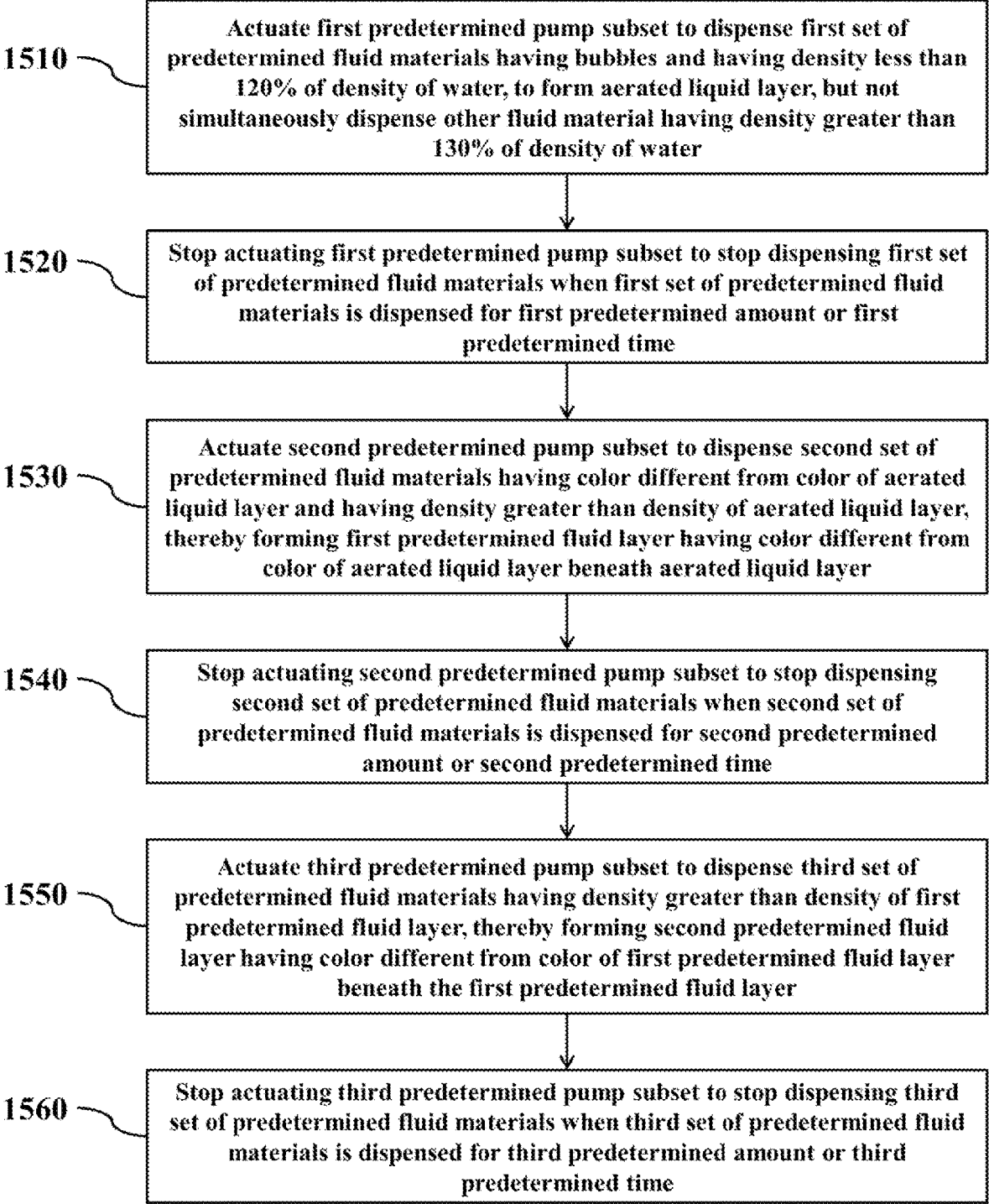

1510 — Actuate first predetermined pump subset to dispense first set of predetermined fluid materials having bubbles and having density less than 120% of density of water, to form aerated liquid layer, but not simultaneously dispense other fluid material having density greater than 130% of density of water 1520 — Stop actuating first predetermined pump subset to stop dispensing first set of predetermined fluid materials when first set of predetermined fluid materials is dispensed for first predetermined amount or first predetermined time 1530 — Actuate second predetermined pump subset to dispense second set of predetermined fluid materials having color different from color of aerated liquid layer and having density greater than density of aerated liquid layer, thereby forming first predetermined fluid layer having color different from color of aerated liquid layer beneath aerated liquid layer 1540 — Stop actuating second predetermined pump subset to stop dispensing second set of predetermined fluid materials when second set of predetermined fluid materials is dispensed for second predetermined amount or second predetermined time 1550 — Actuate third predetermined pump subset to dispense third set of predetermined fluid materials having density greater than density of first predetermined fluid layer, thereby forming second predetermined fluid layer having color different from color of first predetermined fluid layer beneath the first predetermined fluid layer 1560 — Stop actuating third predetermined pump subset to stop dispensing third set of predetermined fluid materials when third set of predetermined fluid materials is dispensed for third predetermined amount or third predetermined time

FIG. 15

AUTOMATED BEVERAGE PREPARATION APPARATUS CAPABLE OF PREPARING LAYERED DRINK

CROSS-REFERENCE TO RELATED APPLICATIONS

This application claims the benefit of priority to U.S. Provisional Application Ser. No. 63/427,193, filed on Nov. 22, 2022; the entirety of which is incorporated herein by reference for all purposes.

BACKGROUND

The disclosure generally relates to an automated beverage preparation apparatus and, more particularly, to an automated beverage preparation apparatus capable of making layered drinks (a.k.a. gradient drinks) and/or sparkling drinks (a.k.a. aerated drinks).

For many consumers, freshly made beverages are more attractive than factory-produced canned or bottled beverages in many aspects, such as freshness, taste, and/or flexibility of customizing ingredient combination. Therefore, many restaurants and beverage vendors offer a variety of freshly made beverages to meet the needs of their customers. For example, various freshly made layered drinks (a.k.a. gradient drinks) having special visual effects, and various freshly made sparkling drinks (a.k.a. aerated drinks) having different flavors are well received by broad customer groups.

The traditional approach of manually preparing freshly made beverages has many disadvantages. For example, it is not easy to maintain the taste consistency of freshly made beverages, personnel training requires considerable time and cost, and the preparation of the freshly made beverages often consumes a lot of labor time, or the like. As a result of rising labor costs and other factors (e.g., increased operating costs due to the impact of the pandemic or inflation), many restaurants and beverage vendors are evaluating whether to use a variety of machinery and equipment to provide or assist in the preparation of freshly-made beverages in order to reduce the required labor time and costs.

It is well known that the preparation of many freshly made layered drinks and sparkling drinks requires to use or mix two or more than two different fluid materials, and some fluid materials may have a density and a viscosity higher than that of water, for example, honey, various syrups, soy milks, nut pulps, fruit juice concentrates, fruit juices containing fruit fibers, tea-based liquids containing small particles (e.g., bubbles or tapioca balls), milk-based liquids, cooking oils, various jams, various sauces, or other thick material and so on.

Traditionally, drink preparing personnel need to hold a stirring rod manually to stir different materials within a container so that the fluid materials having greater density and viscosity can be mixed with other fluid materials, but this approach consumes more labor time and it is more likely to cause hygienic concerns due to not having the stirring rod fully cleaned. An alternative way is to utilize the few beverage preparation apparatuses having electric blender to prepare beverages but this kind of beverage preparation apparatuses are usually bulky, space-consuming, and heavy, which are unsuitable for many applications.

SUMMARY

An example embodiment of an automated beverage preparation apparatus is disclosed, comprising: multiple pumps, respectively utilized for extracting multiple fluid materials stored in multiple material containers, and utilized for pushing corresponding fluid materials to move forward; a fluid output device, comprising multiple fluid outlets, wherein the multiple fluid outlets are respectively coupled with the multiple pumps, and are respectively utilized for dispensing a corresponding fluid material to a beverage container; a user control interface, arranged to operably generate a control command according to a user's manipulation; a processing circuit, coupled with the user control interface, and arranged to operably generate a corresponding control signal according to the control command; and a pump control circuit, coupled with the processing circuit and the multiple pumps, and arranged to operably control the multiple pumps according to the control signal; wherein when the control command requests the automated beverage preparation apparatus to prepare a predetermined layered drink, the pump control circuit conducts a layered drink making operation under control of the processing circuit to cause the fluid output device to dispense different fluid materials to the beverage container, so as to automatically form a layered drink having at least two color layers within the beverage container.

Another example embodiment of an automated beverage preparation apparatus is disclosed, comprising: automated beverage preparation apparatus, comprising: multiple pumps, respectively utilized for extracting multiple fluid materials stored in multiple material containers, and utilized for pushing corresponding fluid materials to move forward; a fluid output device, comprising multiple fluid outlets, wherein the multiple fluid outlets are respectively coupled with the multiple pumps, and are respectively utilized for dispensing a corresponding fluid material to a beverage container; a user control interface, arranged to operably generate a control command according to a user's manipulation; a processing circuit, coupled with the user control interface, and arranged to operably generate a corresponding control signal according to the control command; and a pump control circuit, coupled with the processing circuit and the multiple pumps, and arranged to operably control the multiple pumps according to the control signal; wherein when the control command requests the automated beverage preparation apparatus to prepare a predetermined sparkling drink, the pump control circuit conducts a sparkling drink making operation under control of the processing circuit to cause the fluid output device to dispense different fluid materials to the beverage container in order, so as to automatically form a sparkling drink having a predetermined flavor within the beverage container.

Both the foregoing general description and the following detailed description are examples and explanatory only, and are not restrictive of the invention as claimed.

BRIEF DESCRIPTION OF THE DRAWINGS

FIG. 4 shows a simplified flowchart of a layered drink preparing method adopted by the automated beverage preparation apparatus according to one embodiment of the present disclosure.

FIG. 15 shows a simplified flowchart of a sparkling drink preparing method adopted by the automated beverage preparation apparatus according to one embodiment of the present disclosure.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
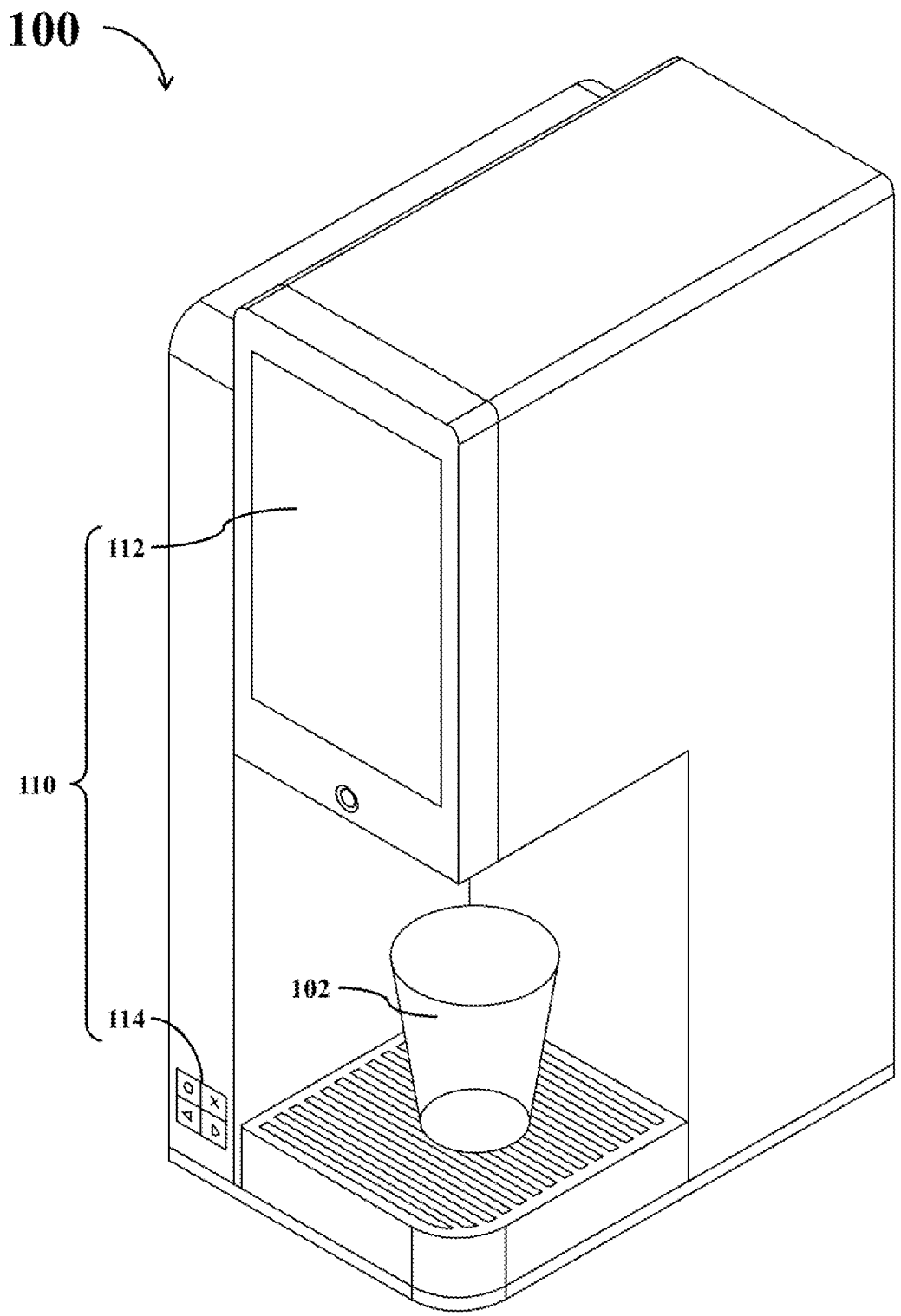
FIG. 1 shows a simplified schematic diagram of an automated beverage preparation apparatus according to one embodiment of the present disclosure.
Figure 2:
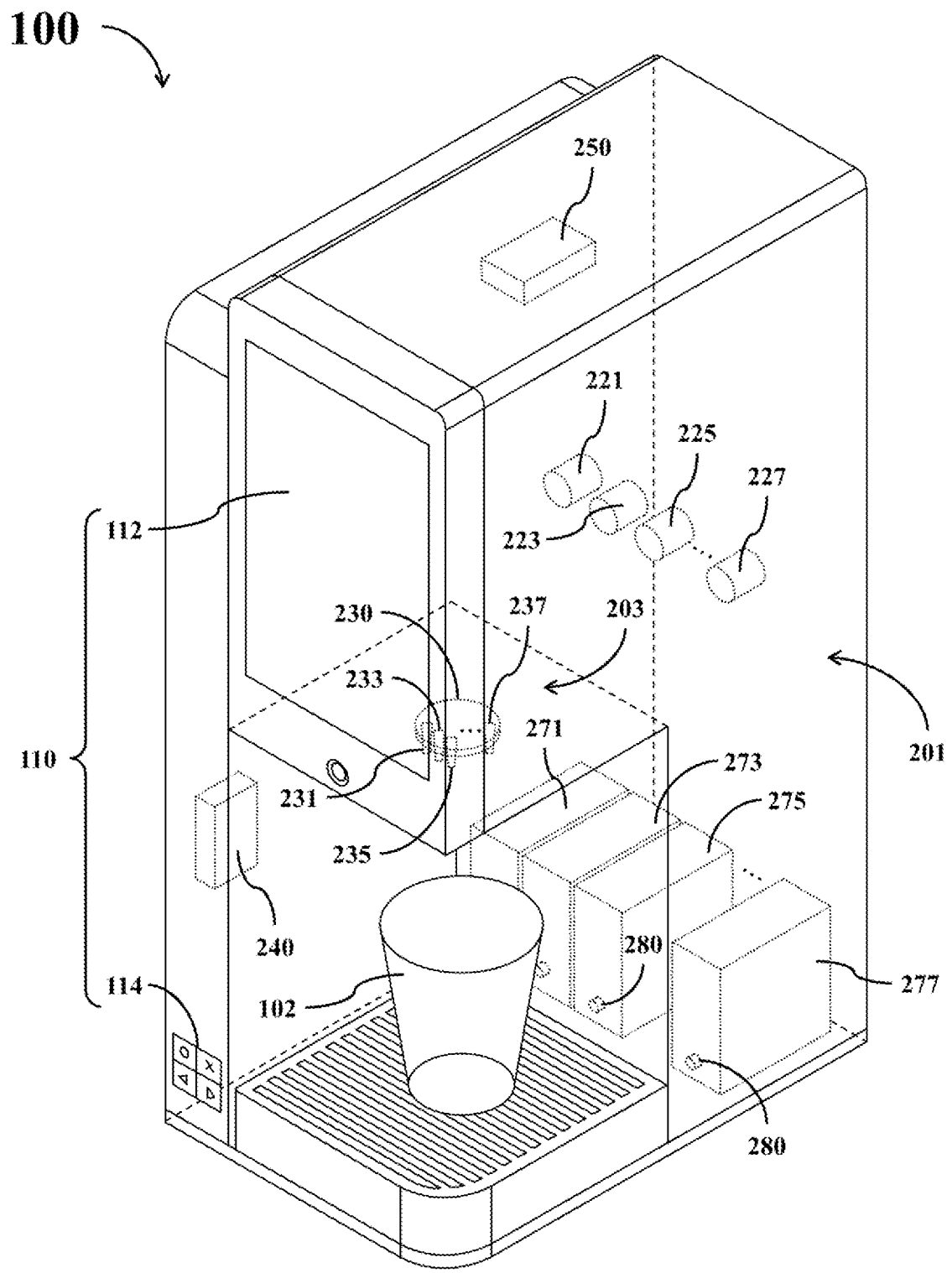
FIG. 2 shows a simplified schematic perspective diagram of the automated beverage preparation apparatus of FIG. 1.
Figure 3:
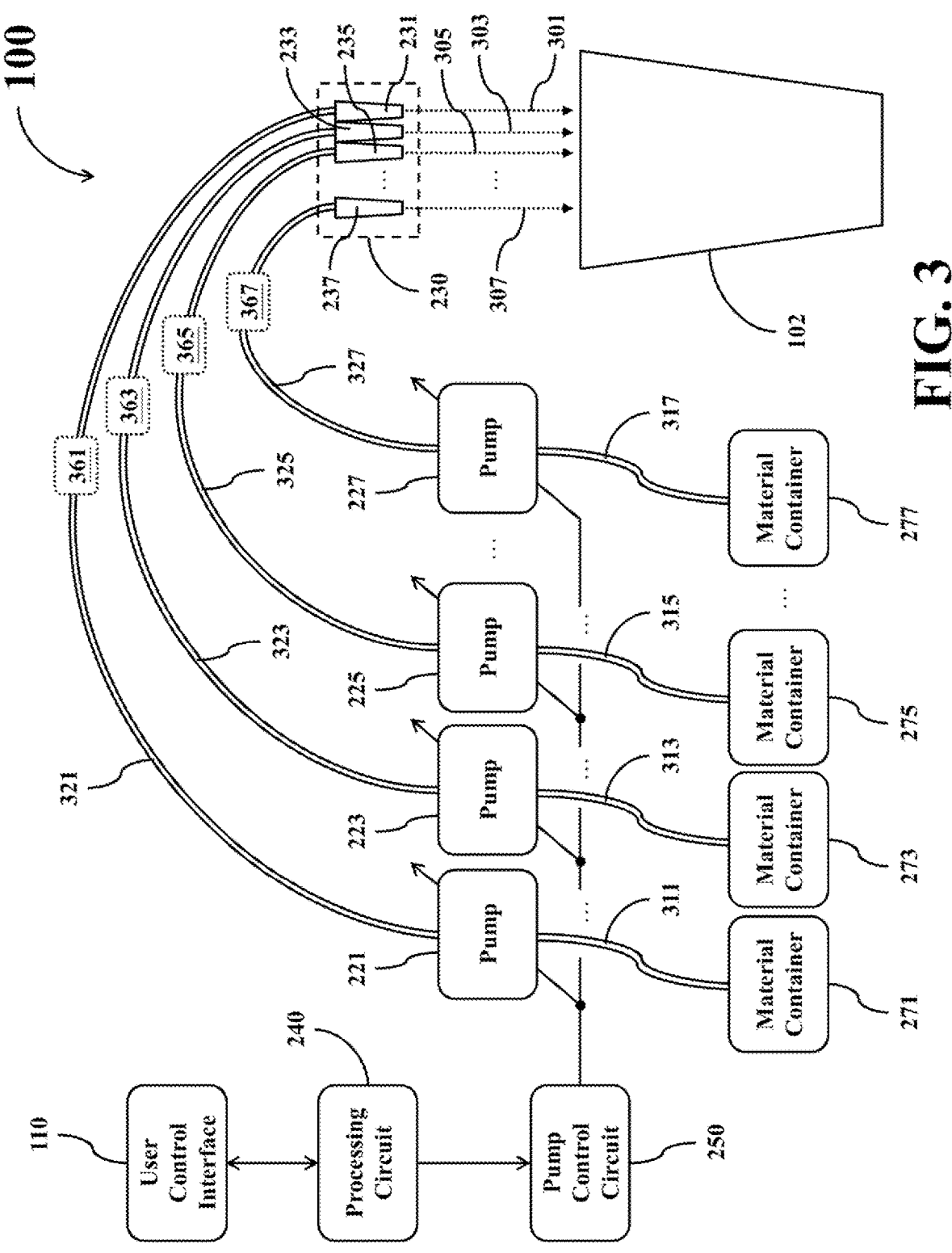
FIG. 3 shows a simplified functional block diagram of the automated beverage preparation apparatus of FIG. 2.

Please refer to FIG. 1 through FIG. 3. FIG. 1 shows a simplified schematic diagram of an automated beverage preparation apparatus 100 according to one embodiment of the present disclosure. FIG. 2 shows a simplified schematic perspective diagram of the automated beverage preparation apparatus 100 of FIG. 1. FIG. 3 shows a simplified functional block diagram of the automated beverage preparation apparatus 100 of FIG. 2. The automated beverage preparation apparatus 100 may automatically add different fluid materials into a beverage container 102 based on the user's choice, so as to make various freshly made layered drinks (a.k.a. gradient drinks) having special visual effects, and/or various freshly made sparkling drinks (a.k.a. aerated drinks) having different flavors.

As shown in FIG. 1 through FIG. 2, the automated beverage preparation apparatus 100 comprises a user control interface 110, an inner chamber 201, and a neck chamber 203. In this embodiment, the user control interface 110 comprises a touch screen 112 and a function key set 114. The touch screen 112 may display related drink menu screens and operating screens for the user to choose from.

In order to reduce the complexity of the drawing contents, some internal objects of the automated beverage preparation apparatus 100 to be further described in the following are deliberately represented by dashed lines in FIG. 2. Please note that the appearance shape of the automated beverage preparation apparatus 100 is merely a simplified exemplary embodiment for the purpose of explanatory convenience, rather than a restriction to the actual appearance of the automated beverage preparation apparatus 100.

The inner chamber 201 of the automated beverage preparation apparatus 100 may be connected to the neck chamber 203. Relevant devices, circuits, components, electrical wires, signal lines, connectors, and/or transmission pipes can be installed inside the inner chamber 201 and/or the neck chamber 203 in a variety of appropriate ways.

As shown in FIG. 2 through FIG. 3, the automated beverage preparation apparatus 100 further comprises multiple pumps, multiple flowmeters, a fluid output device 230, a processing circuit 240, and a pump control circuit 250, wherein the fluid output device 230 comprises multiple fluid outlets. In operations, the multiple pumps in the automated beverage preparation apparatus 100 are utilized for respectively extracting multiple fluid materials stored in multiple material containers, and for pushing corresponding fluid materials to move forward, so as to cause the fluid output device 230 to dispense corresponding fluid materials to the beverage container 102.

To simplify the drawings, only four exemplary pumps (e.g., a first pump 221, a second pump 223, a third pump 225, and a fourth pump 227), four exemplary material containers (e.g., a first material container 271, a second material container 273, a third material container 275, and a fourth material container 277), four exemplary fluid outlets (e.g., a first fluid outlet 231, a second fluid outlet 233, a third fluid outlet 235, and a fourth fluid outlet 237), and four exemplary flowmeters (a first flowmeter 361, a second flowmeter 363, a third flowmeter 365, a fourth flowmeter 367) are shown in FIG. 2 and FIG. 3 as an example for explanation.

Different material containers 271~277 are utilized for respectively storing different fluid materials required for preparing freshly made beverages. For example, the aforementioned fluid materials may be common beverage base materials such as water, sparkling water, black tea, green tea, soy milks, milk, milk-based liquids, coffee, nut pulps, various fruit-based concentrates, various vegetable-based concentrates, or the like.

For another example, the aforementioned fluid materials may be various syrups, such as agave syrup, dulce de leche, fructose, golden syrup, lemonade syrups, maltose syrup, maple syrup, molasses, orgeat, and/or palm syrup, or the like.

For yet another example, the aforementioned fluid materials may be various alcoholic beverages, such as beer, cocktails, and/or sake, or the like.

For yet another example, the aforementioned fluid materials may be various sauces or fluid condiments, such as apple sauce, chutneys, cranberry sauce, salad dressings, fruit coulis, ketchup, tomato sauce, mayonnaise, meat gravies, miso sauce, hummus, pasta sauce, piccalilli, soya sauce, spices sauce, spicy sauce, and/or ginger jam, or the like.

For yet another example, the aforementioned fluid materials may be various fluid materials, such as fruit juices containing fruit fibers, tea liquids with small particles (e.g., pearl or tapioca balls), honey, cooking oils, vinegar, jams, marmalade, pressed fruit paste, beer vinegar, buttercream, condensed milk, and/or cream, or the like.

As can be appreciated from the foregoing descriptions, the fluid material that the automated beverage preparation apparatus 100 can dispense may be fluid having higher density and viscosity than that of water, or may be fluid having lower viscosity than that of water.

Each of the material containers 271~277 has a material connector 280, which may be connected to one of the pumps 221~227 through various appropriate material transmission paths. In some embodiments, each of the material containers 271~277 may be placed within the inner chamber 201 of the automated beverage preparation apparatus 100. In other embodiments, all of or some of the material containers 271~277 may be placed within the neck chamber 203 of the automated beverage preparation apparatus 100. Alternatively, all of or some of the material containers 271~277 may be placed outside the automated beverage preparation apparatus 100.

Each of the aforementioned pumps 221~227 may be connected to other components through various appropriate material transmission paths, and may be installed within the inner chamber 201 and/or the neck chamber 203 in a variety of appropriate spatial arrangements, not restricted to the spatial arrangement shown in FIG. 2.

Each of the pumps 221~227 is arranged to operably pressure received fluid materials, so as to push the fluid materials to move forward. In practice, each of the pumps 221~227 may be realized with various appropriate liquid pump devices capable of pushing fluid forward, such as a peristaltic pump, a diaphragm pump, a rotary diaphragm pump, or similar devices.

Each of the aforementioned fluid outlets 231~237 may be detachably arranged on the fluid output device 230 through various appropriate connections, and the fluid output device 230 may be detachably arranged beneath the neck chamber 203 through various appropriate connections, not restricted to the spatial arrangement shown in FIG. 2. In addition, the output terminal of respective fluid outlets 231~237 may be connected to the output terminal of a corresponding material transmission path through various material transmission paths. The output terminal of respective fluid outlets 231~237 may be exposed outside the neck chamber 203 to facilitate the user to carry out relevant cleaning procedures.

As shown in FIG. 3, the pumps 221~227 are respectively coupled with the material connector 280 of the material containers 271~277 through multiple material transmission paths 311~317. In addition, the fluid outlets 231~237 are respectively coupled with the pumps 221~227 through multiple material transmission paths 321~327, and are utilized for respectively dispensing a corresponding fluid material to the beverage container 102.

For example, the first pump 221 may be utilized for extracting a first fluid material 301 stored in the first material container 271, and for pushing the extracted first fluid material 301 to move forward within the corresponding material transmission paths 311 and 321, so as to cause the first fluid outlet 231 to dispense the first fluid material 301 to the beverage container 102. The second pump 223 may be utilized for extracting a second fluid material 303 stored in the second material container 273, and for pushing the extracted second fluid material 303 to move forward within the corresponding material transmission paths 313 and 323, so as to cause the second fluid outlet 233 to dispense the second fluid material 303 to the beverage container 102. The third pump 225 may be utilized for extracting a third fluid material 305 stored in the third material container 275, and for pushing the extracted third fluid material 305 to move forward within the corresponding material transmission paths 315 and 325, so as to cause the third fluid outlet 235 to dispense the third fluid material 305 to the beverage container 102. The fourth pump 227 may be utilized for extracting a fourth fluid material 307 stored in the first material container 277, and for pushing the extracted fourth fluid material 307 to move forward within the corresponding material transmission paths 317 and 327, so as to cause the fourth fluid outlet 237 to dispense the fourth fluid material 307 to the beverage container 102.

In the embodiment of FIG. 3, the flowmeters 361~367 are respectively arranged on the aforementioned material transmission paths 321~327, and the flowmeters 361~367 are utilized for respectively measuring the material output volume of different fluid materials. In other embodiments, the flowmeters 361~367 may be respectively arranged on the aforementioned material transmission paths 311~317. The aforementioned flowmeters 361~367 may be arranged within the inner chamber 201 and/or the neck chamber 203 in a variety of appropriate spatial arrangements.

In practice, each of the aforementioned material transmission paths (e.g., the material transmission paths 311~317, 321~327) may be a single transmission pipe, or may be a combination of various transmission pipes and various connectors.

Please note that the quantity of the pumps 221~227, the fluid outlets 231~237, the material containers 271~277, the material transmission paths 311~327, and the flowmeters 361~367 shown in FIG. 2 and FIG. 3 is merely an exemplary embodiment, rather than a restriction to the practical implementations.

In practice, appropriate refrigeration equipment may be installed within the automated beverage preparation apparatus 100, in order to extend a preserving time of various fluid materials.

In order to reduce the complexity of the drawing contents, other structures and devices within the automated beverage preparation apparatus 100 are not shown in FIG. 1 and FIG. 2, such as the internal circuit, electrical wires, signal lines, material transmission paths for connecting different components, refrigeration equipment, power supply apparatus, relevant components and frames for supporting or securing the above components, or the like.

When the user wants to utilize the automated beverage preparation apparatus 100 to make a selected layered drink or a selected sparkling drink, the user may manipulate the user control interface 110 (i.e., the touch screen 112 and/or the function key set 114) to configure one or more production parameters for the desired freshly made beverage, such as drink type, beverage item, cup size, beverage volume, sugar level, and/or ice level, or the like. In this situation, the user control interface 110 may generate a control command under the user's manipulation.

The processing circuit 240 is coupled with the user control interface 110, and is arranged to operably generate a corresponding control signal according to the control command.

The pump control circuit 250 is coupled with the processing circuit 240 and the aforementioned multiple pumps 221~227, and is arranged to operably control the operation of the aforementioned multiple pumps 221~227 according to the control signal generated by processing circuit 240 to cause the fluid output device 230 to dispense different fluid materials to the beverage container 102 according to a predetermined order, so as to form a specific drink within the beverage container 102.

For example, when the control command generated by the user control interface 110 requests the automated beverage preparation apparatus 100 to prepare a predetermined layered drink, the pump control circuit 250 conducts a layered drink making operation under control of the processing circuit 240 to cause the fluid output device 230 to dispense different fluid materials to the beverage container 102 according to a preprogrammed order, so as to automatically form a layered drink having at least two color layers within the beverage container 102.

For another example, when the control command generated by the user control interface 110 requests the automated beverage preparation apparatus 100 to prepare a predetermined sparkling drink, the pump control circuit 250 conducts a sparkling drink making operation under control of the processing circuit 240 to cause the fluid output device 230 to dispense different fluid materials to the beverage container 102 according to a preprogrammed order, so as to automatically form a sparkling drink having a predetermined flavor within the beverage container 102.

In practical applications, the touch screen 112 may be replaced with a display device which only has function for display. In another embodiment, the processing circuit 240 and the pump control circuit 250 may be integrated into a single control circuit. In another embodiment, the function of the processing circuit 240 and/or the pump control circuit 250 may be integrated in the touch screen 112.

The operation of making a layered drink conducted by the automated beverage preparation apparatus 100 will be further described in the following by reference to FIG. 4 through FIG. 8. FIG. 4 shows a simplified flowchart of a layered drink preparing method adopted by the automated beverage preparation apparatus 100 according to one embodiment of the present disclosure. FIGS. 5~8 show simplified schematic diagrams of a layered drink making operation conducted by the automated beverage preparation apparatus 100 according to one embodiment of the present disclosure.

As described previously, when the control command generated by the user control interface 110 requests the automated beverage preparation apparatus 100 to prepare a predetermined layered drink, the processing circuit 240 may adopt a layered drink preparing method shown in FIG. 4 to utilize the control signal to instruct the pump control circuit 250 to conduct a layered drink making operation.

Figure 5:
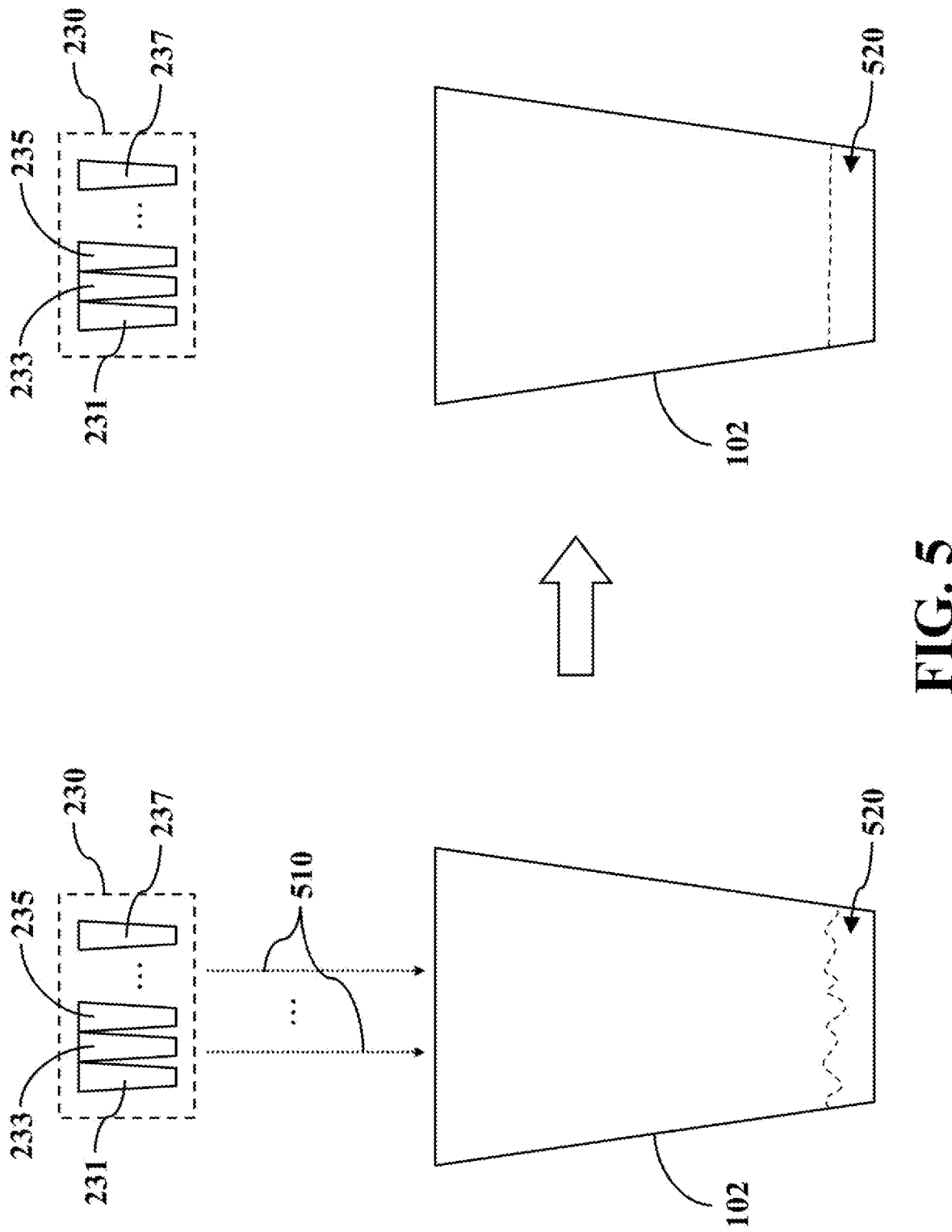
FIGS. 5~8 show simplified schematic diagrams of a layered drink making operation conducted by the automated beverage preparation apparatus according to one embodiment of the present disclosure.

In this situation, as shown in FIG. 5, the pump control circuit 250 may perform the operation 410 under control of the processing circuit 240 to actuate a first target pump subset in multiple pumps 221, 223, 225, 227 to cause the fluid output device 230 to dispense a first set of target fluid materials 510 having a density less than 110% of the density of water, so as to form a buffer layer 520 within the beverage container 102.

Depending on the kinds of fluid materials required for forming the buffer layer 520, the aforementioned first set of target fluid materials 510 may be a single kind of fluid material, or may be two or more than two kinds of fluid materials. Accordingly, the aforementioned first target pump subset may be a single pump, or may be two or more than two pumps.

If the density of the buffer layer 520 is too high, it is highly likely to cause a part of fluid materials of the buffer layer 520 to remain depositing on a bottom of the beverage container 102 during the subsequent beverage making operation. The situation may cause disturbance on subsequent beverage making operation, and may also cause negative impact on the visual effect of the resulting layered drink.

Accordingly, the aforementioned first set of target fluid materials 510 are mainly fluid materials having a density less than 110% of the density of water, such as drinking water, aerating water, sparkling water, tea, beer, coffee, soft drink, carbonated beverage, fruit juice, vegetable juice, malt wort, liquid material comprising animal milk (e.g. cow's milk, goat's milk, camel's milk, or the like), liquid material comprising alcohol (e.g., shochu, rice wine, vodka, gin, rum, tequila, whiskey, brandy, or the like), liquid material comprising sugar, liquid material comprising salt, liquid material comprising vinegar, liquid material comprising cocoa, liquid material comprising lactic acid, liquid material comprising plant extract, or liquid material comprising protein, or a combination of two or more than two of the aforementioned materials.

To make sure the density of the buffer layer 520 is not too high, during the operation of forming the buffer layer 520, the pump control circuit 250 does not actuate other pumps than the first target pump subset to cause the fluid output device 230 to not simultaneously dispense other fluid material having a density greater than 125% of the density of water to the beverage container 102.

According to the experiment results, if the thickness of the buffer layer 520 is smaller than 0.5 centimeter or greater than 7 centimeters, it is highly likely to cause negative impact on the mixing uniformity of different fluid materials to be added during the subsequent stage, and may also cause negative impact on the visual effect of the resulting layered drink.

Therefore, when the fluid output device 230 dispenses the first set of target fluid materials 510 for a first target amount or a first target time, the processing circuit 240 may instruct the pump control circuit 250 to perform the operation 420 to stop actuating the first target pump subset to cause the fluid output device 230 to stop dispensing the first set of target fluid materials 510, thereby keeping the thickness of the buffer layer 520 between 0.5 centimeter and 7 centimeters. For example, the thickness of the buffer layer 520 may be 0.5 centimeter, 0.7 centimeter, 1 centimeter, 1.5 centimeters, 1.8 centimeters, 2 centimeters, 2.5 centimeters, 3 centimeters, 3.5 centimeters, 4 centimeters, 4.5 centimeters, 5 centimeters, 5.5 centimeters, 6 centimeters, 6.5 centimeters, 7 centimeters, or the like.

In a period during which the fluid output device 230 dispenses the first set of target fluid materials 510 to the beverage container 102, the liquid surface of the buffer layer 520 would be at a turbulence state. Generally, at the time point when the fluid output device 230 stops dispensing the first set of target fluid materials 510, the fluctuation of the buffer layer 520 will not rest immediately.

However, according to the experiment results, if other fluid materials are added when the buffer layer 520 is still at a turbulence state, it is possible to cause negative impact on the mixing uniformity of the newly-added fluid materials.

Therefore, in this embodiment, when the fluid output device 230 dispenses the first set of target fluid materials 510 for the first target amount or the first target time, the processing circuit 240 may instruct the pump control circuit 250 to stop actuating all pumps for a predetermined time (e.g., 1 second, 1.2 seconds, 1.5 seconds, 1.8 seconds, 2 seconds, 2.5 seconds, or the like), so that the fluid output device 230 does not dispense any fluid material to the beverage container 102 during this time period, thereby mitigating the fluctuation level of the buffer layer 520, as shown in FIG. 5.

Figure 6:
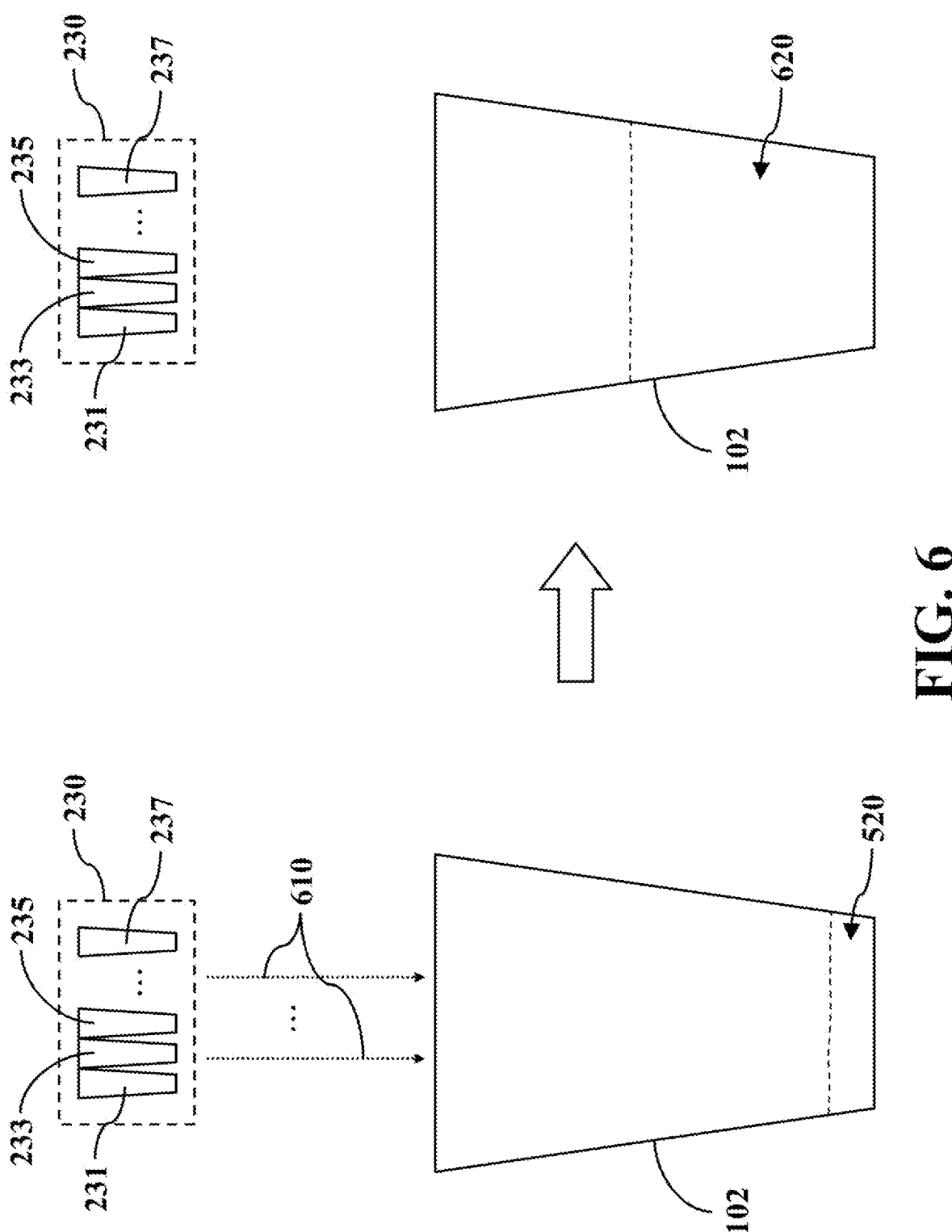

Afterwards, as shown in FIG. 6, the processing circuit 240 may instruct the pump control circuit 250 to perform the operation 430 to actuate a second target pump subset in the multiple pumps 221, 223, 225, 227, so as to cause the fluid output device 230 to dispense a second set of target fluid materials 610 comprising at least two fluid materials, so that the newly-added second set of target fluid materials 610 and the buffer layer 520 are mixed to form a first target fluid layer 620 within the beverage container 102.

Depending on the kinds of fluid materials required to be mixed at this stage, the aforementioned second set of target fluid materials 610 may be two kinds of fluid materials, or may be three or more than three kinds of fluid materials. Accordingly, the aforementioned second target pump subset may be two pumps, or may be three or more than three pumps. The pumps of the second target pump subset may be completely different from the pumps of the aforementioned first target pump subset, or may comprise a part of pumps of the first target pump subset.

The second set of target fluid materials 610 dispensed by the fluid output device 230 in the operation 430 may comprise at least one kind of first target fluid material having a density less than 110% of the density of water and at least one kind of second target fluid material having a density greater than 115% of the density of water.

The aforementioned first target fluid material may be drinking water, tea, coffee, soft drink, carbonated beverage, fruit juice, vegetable juice, malt wort, liquid material comprising animal milk (e.g., cow's milk, goat's milk, camel's milk, or the like), liquid material comprising alcohol (e.g., shochu, rice wine, vodka, gin, rum, tequila, whiskey, brandy, or the like), liquid material comprising sugar, liquid material comprising salt, liquid material comprising vinegar, liquid material comprising cocoa, liquid material comprising lactic acid, liquid material comprising plant extract, or liquid material comprising protein, or a combination of two or more than two of the aforementioned materials. The aforementioned second target fluid material may be various syrups, jams, chocolate sauces, peanut butters, lemonade, seasoning sauces, or the like.

When the second set of target fluid materials 610 dispensed by the fluid output device 230 falls into the beverage container 102, due to that the buffer layer 520 has already existed on the bottom of the beverage container 102, the fluid materials of the second set of target fluid materials 610 will not directly touch the bottom of the beverage container 102. Instead, the fluid materials of the second set of target fluid materials 610 will need to pass through the buffer layer 520 first to make it possible to touch the bottom of the beverage container 102.

Accordingly, the presence the buffer layer 520 can significantly reduce the speed and impact force when the fluid materials of the second set of target fluid materials 610 reaches the bottom of the beverage container 102. As a result, it can effectively prevent fluid materials having greater density (e.g., various syrups, jams, seasoning sauces, or the like) from sticking on the bottom of the beverage container 102 and consequently being difficult to mix well with other fluid materials.

From another aspect, the presence of the aforementioned buffer layer 520 can significantly increase the mixing uniformity of the second set of target fluid materials 610 and the first set of target fluid materials 510 within the beverage container 102, and manually stirring or utilizing other mixers for stirring is no longer required.

When the fluid output device 230 dispenses the second set of target fluid materials 610 for a second target amount or a second target time, the processing circuit 240 may instruct the pump control circuit 250 to perform the operation 440 to stop actuating the second target pump subset to cause the fluid output device 230 to stop dispensing the second set of target fluid materials 610. In practice, the pump control circuit 250 may stop actuating all pumps of the second target pump subset at the same time, or alternatively the pump control circuit 250 may first stop actuating a part of the pumps of the second target pump subset and then stop actuating other pumps of the second target pump subset after a short period of time. In other words, the fluid output device 230 may stop dispensing all fluid materials of the second set of target fluid materials 610 at the same time, or the fluid output device 230 may first stop dispensing a part of the fluid materials of the second set of target fluid materials 610 and then stop dispensing other fluid materials of the second set of target fluid materials 610 after a short period of time.

Figure 7:
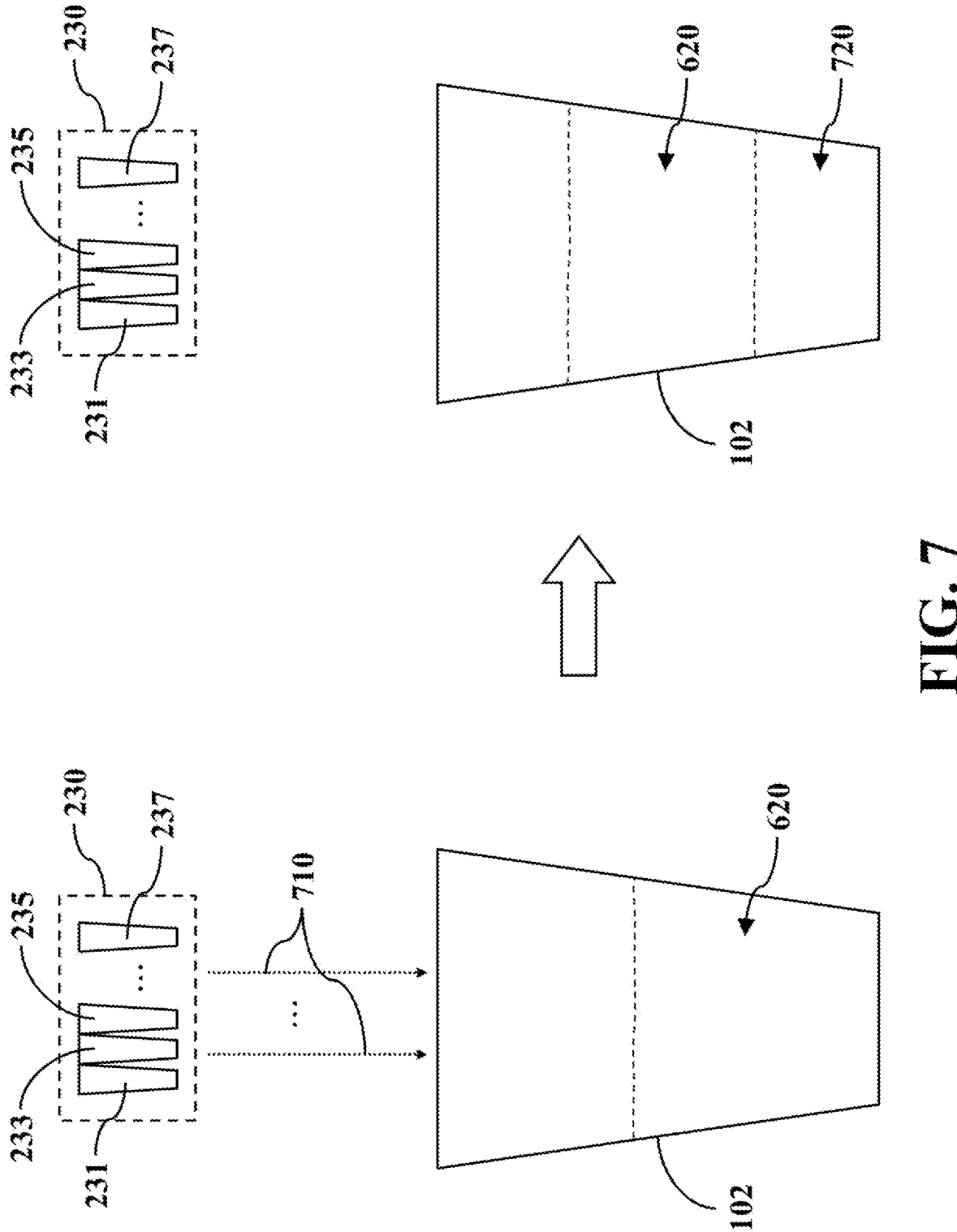

As shown in FIG. 7, after forming the first target fluid layer 620, the processing circuit 240 may instruct the pump control circuit 250 to perform the operation 450 to actuate a third target pump subset in the multiple pumps 221, 223, 225, 227, so as to cause the fluid output device 230 to dispense a third set of target fluid materials 710 having a color different from the color of the first target fluid layer 620 and having a density greater than a density of the first target fluid layer 620, thereby forming a second target fluid layer 720 having a color different from the color of the first target fluid layer 620 beneath the first target fluid layer 620.

Depending on the kinds of fluid materials required for creating the color of the second target fluid layer 720, the aforementioned third set of target fluid materials 710 may be a single kind of fluid material having a predetermined color, or may be two or more than two kinds of fluid materials having different colors. Accordingly, the aforementioned third target pump subset may be a single pump, or may be two or more than two pumps.

Since the density of the third set of target fluid materials 710 is greater than the density of the first target fluid layer 620, the second target fluid layer 720 formed from the third set of target fluid materials 710 will naturally sink beneath the first target fluid layer 620 and has a color different from the color of the first target fluid layer 620.

During the process of the newly-added third set of target fluid materials 710 sinking down, a part of the materials of the third set of target fluid materials 710 will mix into the first target fluid layer 620 due to diffusion. Accordingly, in some applications, the newly-added third set of target fluid materials 710 may be utilized to adjust the color of the first target fluid layer 620.

When the fluid output device 230 dispenses the third set of target fluid materials 710 for a third target amount or a third target time, the processing circuit 240 may instruct the pump control circuit 250 to perform the operation 460 to stop actuating the third target pump subset to cause the fluid output device 230 to stop dispensing the third set of target fluid materials 710. In practice, the pump control circuit 250 may stop actuating all pumps of the third target pump subset at the same time, or alternatively the pump control circuit 250 may first stop actuating a part of the pumps of the third target pump subset and then stop actuating other pumps of the third target pump subset after a short period of time. In other words, the fluid output device 230 may stop dispensing all fluid materials of the third set of target fluid materials 710 at the same time, or the fluid output device 230 may first stop dispensing a part of the fluid materials of the third set of target fluid materials 710 and then stop dispensing other fluid materials of the third set of target fluid materials 710 after a short period of time.

Figure 8:
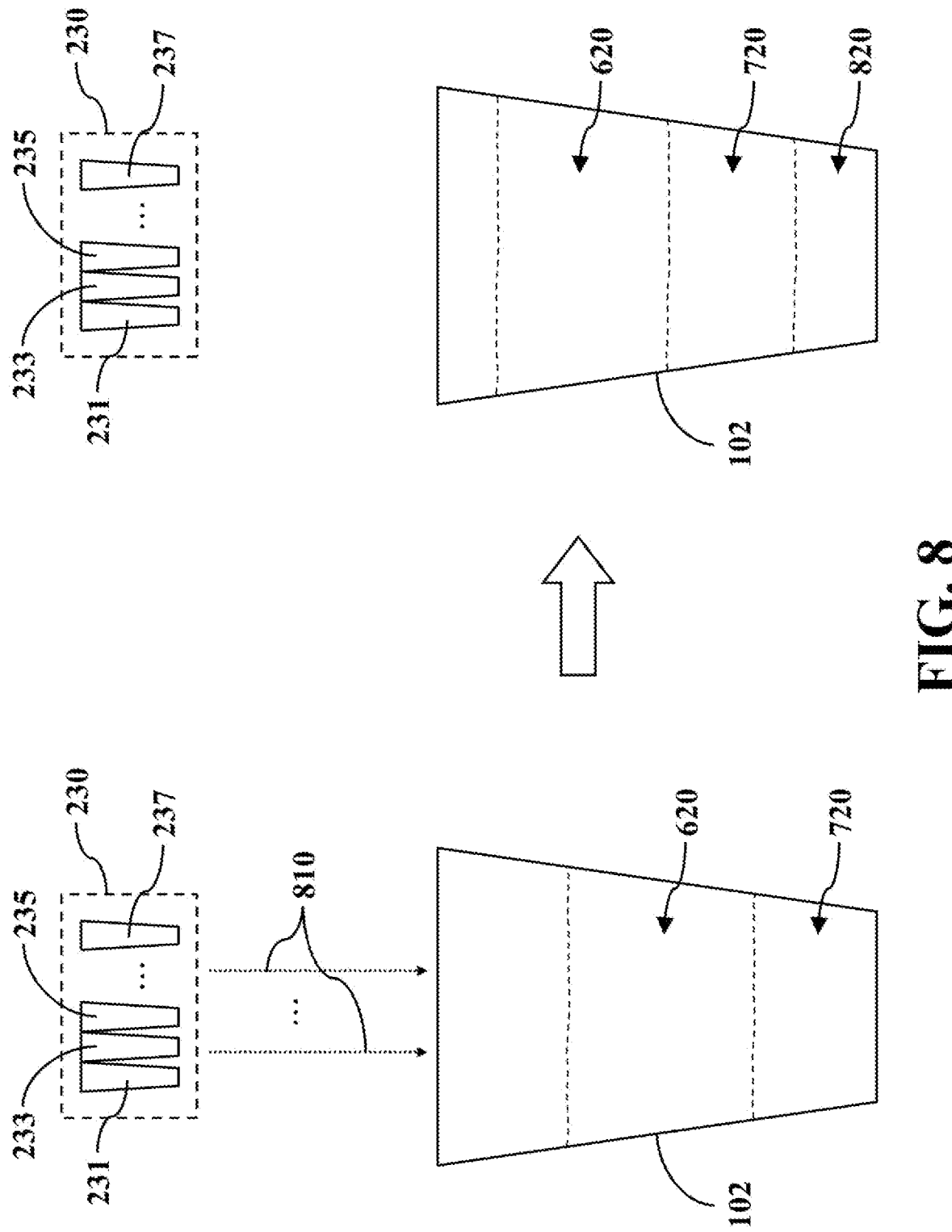

As shown in FIG. 8, after forming the second target fluid layer 720, the processing circuit 240 may instruct the pump control circuit 250 to perform the operation 470 to actuate a fourth target pump subset in the multiple pumps 221, 223, 225, 227, so as to cause the fluid output device 230 to dispense a fourth set of target fluid materials 810 having a color different from the color of the second target fluid layer 720 and having a density greater than the density of the second target fluid layer 720, thereby forming a third target fluid layer 820 having a color different from the color of the second target fluid layer 720 beneath the second target fluid layer 720.

Depending on the kinds of fluid materials required for creating the color of the third target fluid layer 820, the aforementioned fourth set of target fluid materials 810 may be a single kind of fluid material having a predetermined color, or may be two or more than two kinds of fluid materials having different colors. Accordingly, the aforementioned fourth target pump subset may be a single pump, or may be two or more than two pumps.

Since the density of the fourth set of target fluid materials 810 is greater than the density of the second target fluid layer 720, the third target fluid layer 820 formed from the fourth set of target fluid materials 810 will naturally sink beneath the second target fluid layer 720 and has a color different from the color of the second target fluid layer 720.

During the process of the newly-added fourth set of target fluid materials 810 sinking down, a part of the materials of the fourth set of target fluid materials 810 will mix into the first target fluid layer 620 and/or the second target fluid layer 720 due to diffusion. Accordingly, in some applications, the newly-added fourth set of target fluid materials 810 may be utilized to adjust the color of the first target fluid layer 620 and/or the color of the second target fluid layer 720.

When the fluid output device 230 dispenses the fourth set of target fluid materials 810 for a fourth target amount or a fourth target time, the processing circuit 240 may instruct the pump control circuit 250 to perform the operation 480 to stop actuating the fourth target pump subset to cause the fluid output device 230 to stop dispensing the fourth set of target fluid materials 810. In practice, the pump control circuit 250 may stop actuating all pumps of the fourth target pump subset at the same time, or alternatively the pump control circuit 250 may first stop actuating a part of the pumps of the fourth target pump subset and then stop actuating other pumps of the fourth target pump subset after a short period of time. In other words, the fluid output device 230 may stop dispensing all fluid materials of the fourth set of target fluid materials 810 at the same time, or the fluid output device 230 may first stop dispensing a part of the fluid materials of the fourth set of target fluid materials 810 and then stop dispensing other fluid materials of the fourth set of target fluid materials 810 after a short period of time.

In this way, the automated beverage preparation apparatus 100 is enabled to complete a preparing procedure of a layered drink having three different color layers. If it is desired that the layered drink within the beverage container 102 has more color layers, the processing circuit 240 may further instruct the pump control circuit 250 to repeat operations similar to that in the aforementioned operation 470 and operation 480 to actuate different pump subset to cause the fluid output device 230 to dispense another set of target fluid materials having a color different from the color of the currently bottommost fluid layer and having a density greater than the density of the currently bottommost fluid layer, so as to additionally form another target fluid layer having a different color from the color of the currently bottommost fluid layer beneath the currently bottommost fluid layer 720.

In practice, the automated beverage preparation apparatus 100 may be utilized to make sparkling layered drink (a.k.a. sparkling gradient drink). The operation of making a sparkling layered drink conducted by the automated beverage preparation apparatus 100 will be further described in the following by reference to FIG. 9 through FIG. 12. FIGS. 9~12 show simplified schematic diagrams of a layered drink making operation conducted by the automated beverage preparation apparatus 100 according to another embodiment of the present disclosure.

When the control command generated by the user control interface 110 requests the automated beverage preparation apparatus 100 to prepare a predetermined sparkling layered drink, the processing circuit 240 may similarly adopt the layered drink making operation shown in FIG. 4 to utilize the control signal to instruct the pump control circuit 250 to conduct a layered drink making operation.

Figure 9:
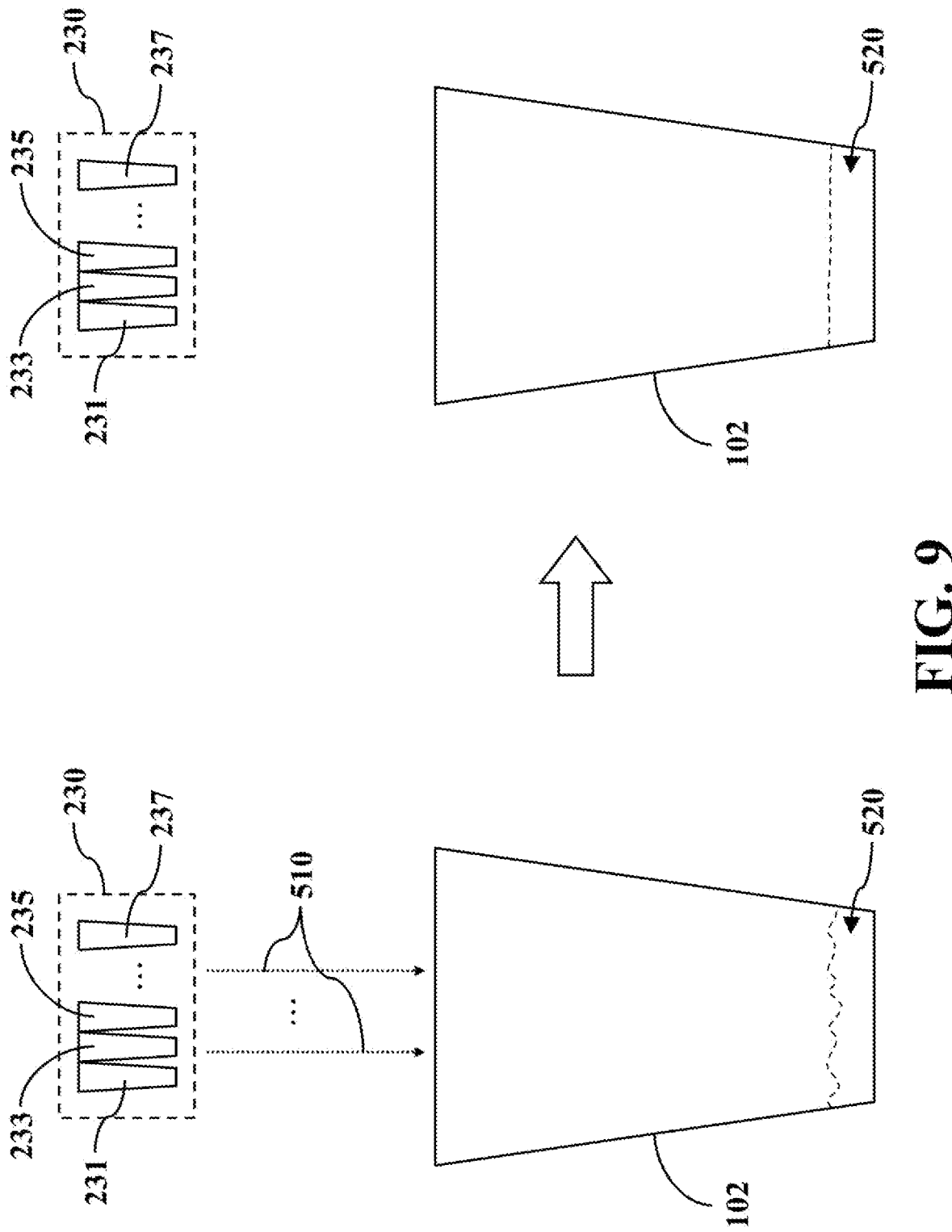
FIGS. 9~12 show simplified schematic diagrams of a layered drink making operation conducted by the automated beverage preparation apparatus according to another embodiment of the present disclosure.

In this situation, as shown in FIG. 9, the pump control circuit 250 may perform the operation 410 under control of the processing circuit 240 to actuate a first target pump subset in the multiple pumps 221, 223, 225, 227 to cause the fluid output device 230 to dispense a first set of target fluid materials 510 having a density less than 110% of the density of water, so as to form a buffer layer 520 within the beverage container 102.

The fluid materials required to form the buffer layer 520 of FIG. 9 and the method to form the buffer layer 520 of FIG. 9 are similar to those of the aforementioned buffer layer 520 of FIG. 5. For the sake of brevity, those descriptions will not be repeated here.

Therefore, when the fluid output device 230 dispenses the first set of target fluid materials 510 for a first target amount or a first target time, the processing circuit 240 also instructs the pump control circuit 250 to perform the operation 420 to stop actuating the first target pump subset to cause the fluid output device 230 to stop dispensing the first set of target fluid materials 510, thereby keeping the thickness of the buffer layer 520 between 0.5 centimeter and 7 centimeters. For example, the thickness of the buffer layer 520 may be 0.5 centimeter, 0.7 centimeter, 1 centimeter, 1.5 centimeters, 1.8 centimeters, 2 centimeters, 2.5 centimeters, 3 centimeters, 3.5 centimeters, 4 centimeters, 4.5 centimeters, 5 centimeters, 5.5 centimeters, 6 centimeters, 6.5 centimeters, 7 centimeters, or the like.

Additionally, when the fluid output device 230 dispenses the first set of target fluid materials 510 for the first target amount or the first target time, the processing circuit 240 also instructs the pump control circuit 250 to stop actuating all pumps for a predetermined time (e.g., 1 second, 1.2 seconds, 1.5 seconds, 1.8 seconds, 2 seconds, 2.5 seconds, or the like), so that the fluid output device 230 does not dispense any fluid material to the beverage container 102 during this time period, thereby mitigating the fluctuation level of the buffer layer 520, as shown in FIG. 9.

Figure 10:
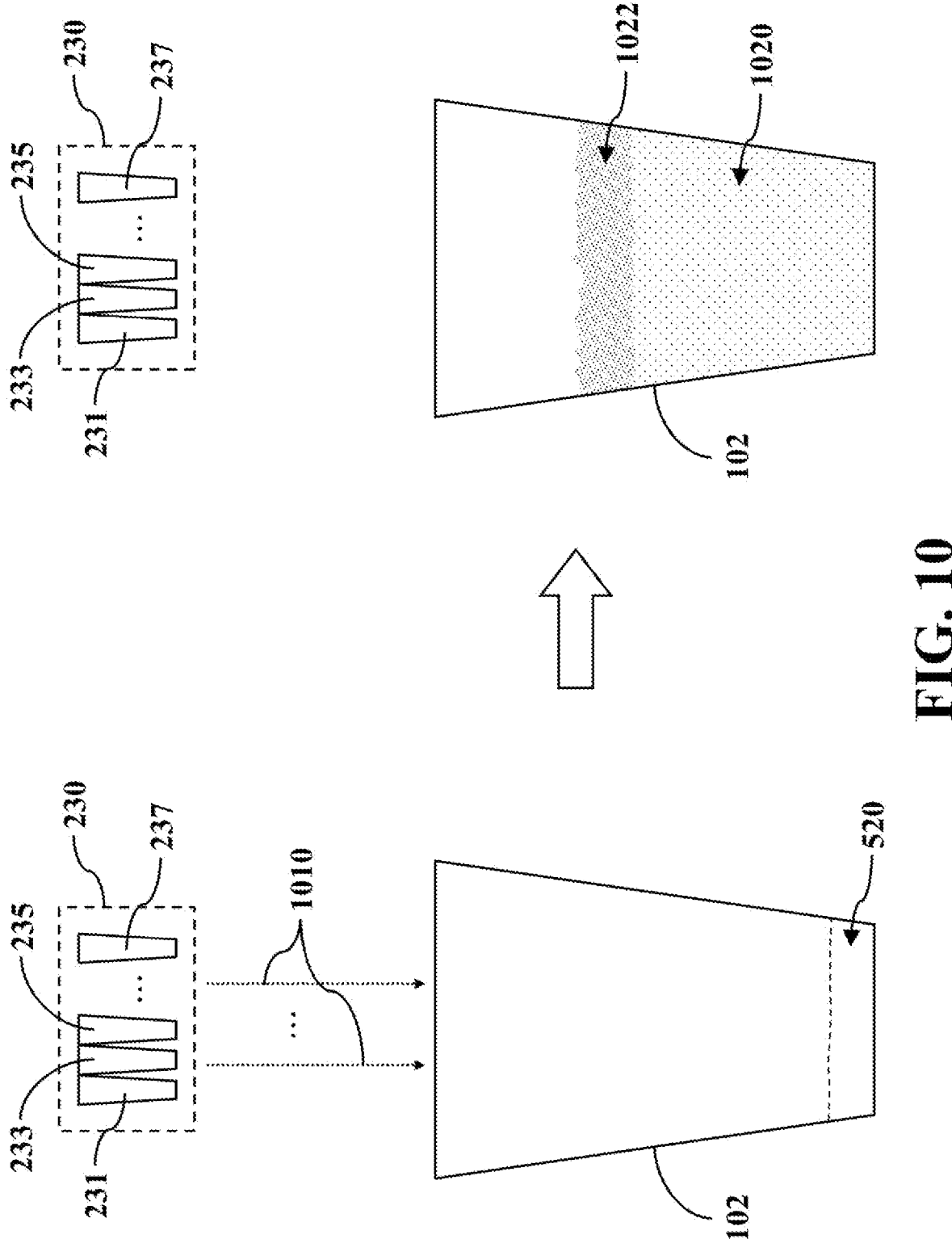

Afterwards, as shown in FIG. 10, the processing circuit 240 may instruct the pump control circuit 250 to perform the operation 430 to actuate a second target pump subset in the multiple pumps 221, 223, 225, 227, so as to cause the fluid output device 230 to dispense a second set of target fluid materials 1010 comprising at least two fluid materials, so that the newly-added second set of target fluid materials 1010 and the buffer layer 520 are mixed to form a sparkling first target fluid layer 1020 within the beverage container 102.

Depending on the kinds of fluid materials required to be mixed at this stage, the aforementioned second set of target fluid materials 1010 may be two kinds of fluid materials, or may be three or more than three kinds of fluid materials. Accordingly, the aforementioned second target pump subset may be two pumps, or may be three or more than three pumps.

The second set of target fluid materials 1010 dispensed by the fluid output device 230 in the operation 430 comprises at least one kind of sparkling fluid material, such as various aerating water, sparkling water, beer, soft drink, or carbonated beverage, or the like. Other fluid materials of the second set of target fluid materials 1010 may comprise the aforementioned first target fluid material and/or second target fluid material.

When the second set of target fluid materials 1010 dispensed by the fluid output device 230 falls into the beverage container 102, due to that the buffer layer 520 has already existed on the bottom of the beverage container 102, the fluid materials of the second set of target fluid materials 1010 will not directly touch the bottom of the beverage container 102. Instead, the fluid materials of the second set of target fluid materials 1010 will need to pass through the buffer layer 520 first to make it possible to touch the bottom of the beverage container 102.

Accordingly, the presence the buffer layer 520 can significantly reduce the speed and impact force of the fluid materials of the second set of target fluid materials 1010 when they reach the bottom of the beverage container 102. As a result, it can effectively prevent fluid materials having greater density (e.g., various syrups, jams, seasoning sauces, or the like) from sticking on the bottom of the beverage container 102 and consequently being difficult to mix well with other fluid materials.

From another aspect, the presence of the aforementioned buffer layer 520 can significantly increase the mixing uniformity of the second set of target fluid materials 1010 and the first set of target fluid materials 510 within the beverage container 102, and manually stirring or utilizing other mixers for stirring is no longer required.

As shown in FIG. 10, since the second set of target fluid materials 1010 comprises at least one kind of sparkling fluid material, not only that the first target fluid layer 1020 is a sparkling liquid layer, but also a bubble layer 1022 will form above the first target fluid layer 1020. In normal situation, the bubble layer 1022 primarily comprises carbon dioxide.

When the fluid output device 230 dispenses the second set of target fluid materials 1010 for a second target amount or a second target time, the processing circuit 240 may instruct the pump control circuit 250 to perform the operation 440 to stop actuating the second target pump subset to cause the fluid output device 230 to stop dispensing the second set of target fluid materials 1010. In practice, the pump control circuit 250 may stop actuating all pumps of the second target pump subset at the same time, or alternatively the pump control circuit 250 may first stop actuating a part of the pumps of the second target pump subset and then stop actuating other pumps of the second target pump subset after a short period of time. In other words, the fluid output device 230 may stop dispensing all fluid materials of the second set of target fluid materials 1010 at the same time, or the fluid output device 230 may first stop dispensing a part of the fluid materials of the second set of target fluid materials 1010 and then stop dispensing other fluid materials of the second set of target fluid materials 1010 after a short period of time.

Figure 11:
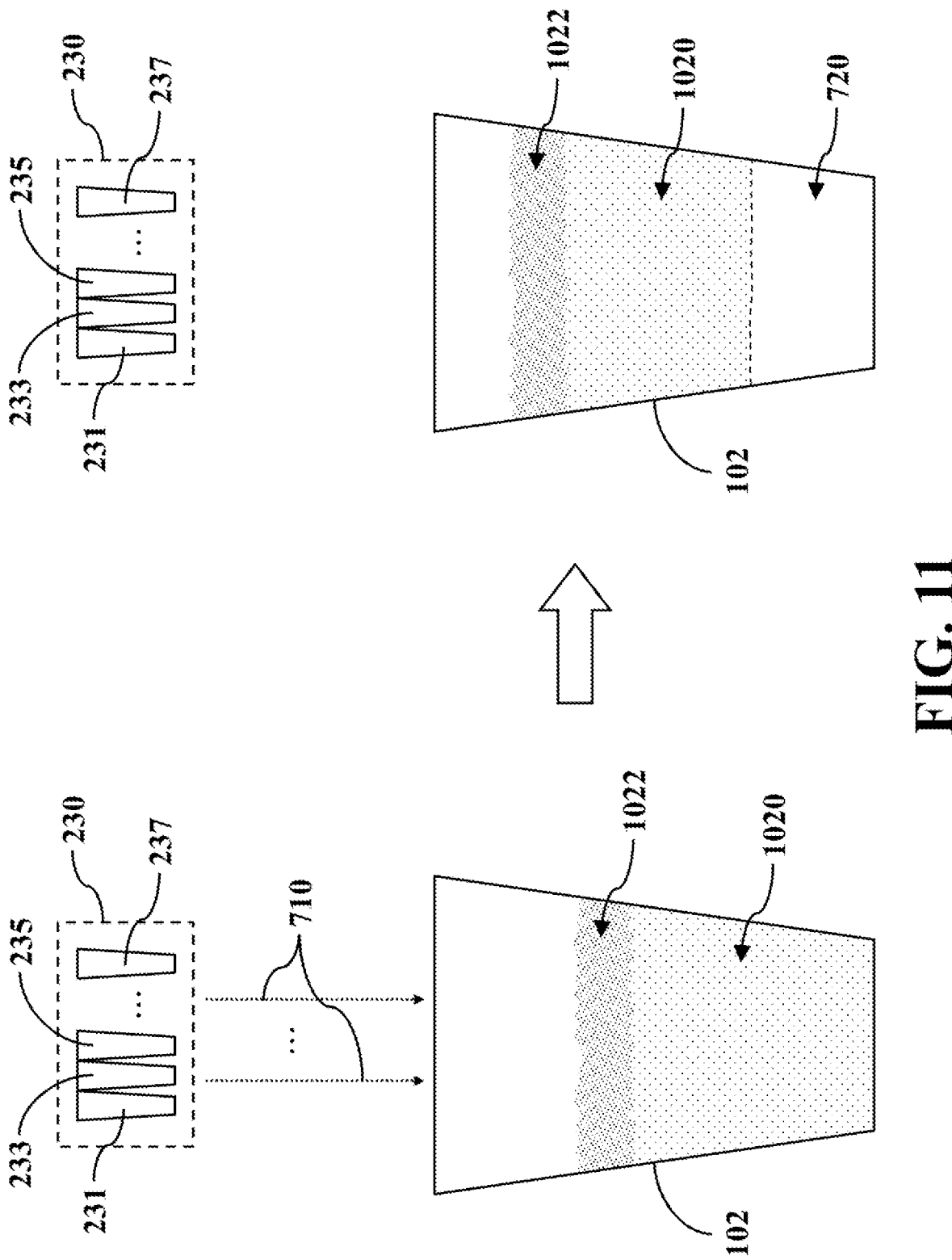

As shown in FIG. 11, after forming the first target fluid layer 1020, the processing circuit 240 may instruct the pump control circuit 250 to perform the operation 450 to actuate a third target pump subset in the multiple pumps 221, 223, 225, 227, so as to cause the fluid output device 230 to dispense a third set of target fluid materials 710 having a color different from the color of the first target fluid layer 1020 and having a density greater than a density of the first target fluid layer 1020, thereby forming a second target fluid layer 720 having a color different from the color of the first target fluid layer 1020 beneath the first target fluid layer 1020.

The fluid materials required to form the second target fluid layer 720 of FIG. 11 and the method to form the second target fluid layer 720 of FIG. 11 are similar to those of the aforementioned second target fluid layer 720 of FIG. 7. For the sake of brevity, those descriptions will not be repeated here.

Since the density of the third set of target fluid materials 710 is greater than the density of the first target fluid layer 1020, the second target fluid layer 720 formed from the third set of target fluid materials 710 will naturally sink beneath the first target fluid layer 1020 and has a color different from the color of the first target fluid layer 1020.

During the process of the newly-added third set of target fluid materials 710 sinking down, a part of the materials of the third set of target fluid materials 710 will mix into the first target fluid layer 1020 due to diffusion. Accordingly, in some applications, the newly-added third set of target fluid materials 710 may be utilized to adjust the color of the first target fluid layer 1020.

When the fluid output device 230 dispenses the third set of target fluid materials 710 for a third target amount or a third target time, the processing circuit 240 may instruct the pump control circuit 250 to perform the operation 460 to stop actuating the third target pump subset to cause the fluid output device 230 to stop dispensing the third set of target fluid materials 710. Similarly, the pump control circuit 250 may stop actuating all pumps of the third target pump subset at the same time, or alternatively the pump control circuit 250 may first stop actuating a part of the pumps of the third target pump subset and then stop actuating other pumps of the third target pump subset after a short period of time. In other words, the fluid output device 230 may stop dispensing all fluid materials of the third set of target fluid materials 710 at the same time, or the fluid output device 230 may first stop dispensing a part of the fluid materials of the third set of target fluid materials 710 and then stop dispensing other fluid materials of the third set of target fluid materials 710 after a short period of time.

Figure 12:
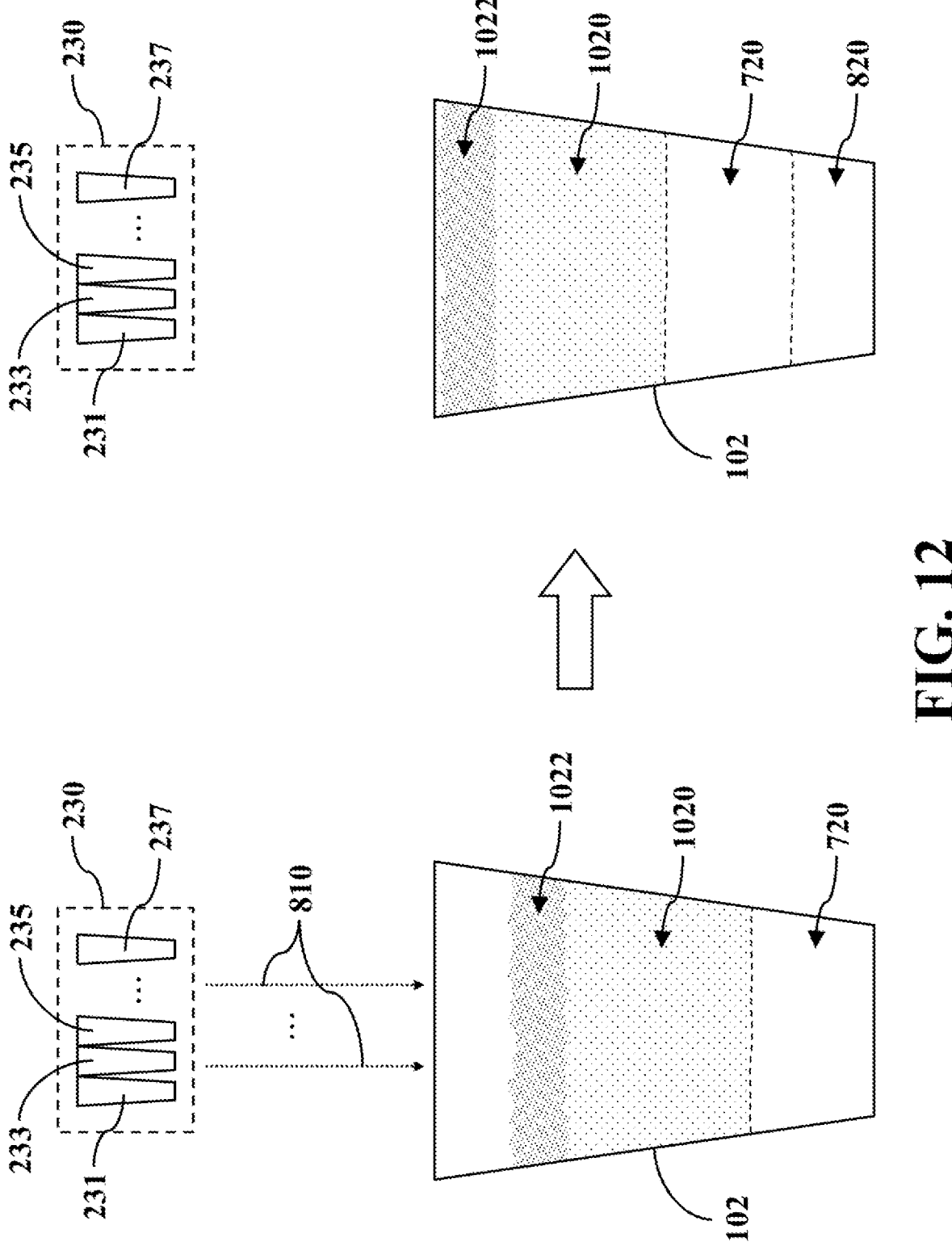

As shown in FIG. 12, after forming the second target fluid layer 720, the processing circuit 240 may instruct the pump control circuit 250 to perform the operation 470 to actuate a fourth target pump subset in the multiple pumps 221, 223, 225, 227, so as to cause the fluid output device 230 to dispense a fourth set of target fluid materials 810 having a color different from the color of the second target fluid layer 720 and having a density greater than a density of the second target fluid layer 720, thereby forming a third target fluid layer 820 having a color different from the color of the second target fluid layer 720 beneath the second target fluid layer 720.

The fluid materials required to form the third target fluid layer 820 of FIG. 12 and the method to form the third target fluid layer 820 of FIG. 12 are similar to those of the aforementioned third target fluid layer 820 of FIG. 8. For the sake of brevity, those descriptions will not be repeated here.

Since the density of the fourth set of target fluid materials 810 is greater than the density of the second target fluid layer 720, the third target fluid layer 820 formed from the fourth set of target fluid materials 810 will naturally sink beneath the second target fluid layer 720 and has a color different from the color of the second target fluid layer 720.

During the process of the newly-added fourth set of target fluid materials 810 sinking down, a part of the materials of fourth set of target fluid materials 810 will mix into the first target fluid layer 1020 and/or the second target fluid layer 720 due to diffusion. Accordingly, in some applications, the newly-added fourth set of target fluid materials 810 may be utilized to adjust the color of the first target fluid layer 1020 and/or the second target fluid layer 720.

When the fluid output device 230 dispenses the fourth set of target fluid materials 810 for a fourth target amount or a fourth target time, the processing circuit 240 may instruct the pump control circuit 250 to perform the operation 480 to stop actuating the fourth target pump subset to cause the fluid output device 230 to stop dispensing the fourth set of target fluid materials 810. Similarly, the pump control circuit 250 may stop actuating all pumps of the fourth target pump subset at the same time, or alternatively the pump control circuit 250 may first stop actuating a part of the pumps of the fourth target pump subset and then stop actuating other pumps of the fourth target pump subset after a short period of time. In other words, the fluid output device 230 may stop dispensing all fluid materials of the fourth set of target fluid materials 810 at the same time, or the fluid output device 230 may first stop dispensing a part of the fluid materials of the fourth set of target fluid materials 810 and then stop dispensing other fluid materials of the fourth set of target fluid materials 810 after a short period of time.

In this way, the automated beverage preparation apparatus 100 is enabled to complete a preparing procedure of a sparkling layered drink having three different color layers. If it is desired that the layered drink within the beverage container 102 has more color layers, the processing circuit 240 may further instruct the pump control circuit 250 to repeat operations similar to that in the aforementioned operation 470 and operation 480 to actuate different pump subset to cause the fluid output device 230 to dispense another set of target fluid materials having a color different from the color of the bottommost fluid layer and having a density greater than the density of the bottommost fluid layer, so as to additionally form another target fluid layer having a different color from the color of the currently bottommost fluid layer beneath the currently bottommost fluid layer.

As described previously, during the process in which the automated beverage preparation apparatus 100 makes a layered drink, the automated beverage preparation apparatus 100 will first form a buffer layer 520 within the beverage container 102, and then dispense other fluid materials to the beverage container 102 in order. In other words, the fluid output device 230 of the automated beverage preparation apparatus 100 dispenses the aforementioned second set of target fluid materials 610 (or 1010) to the beverage container 102 only after the buffer layer 520 is formed within the beverage container 102.

As can be appreciated from the foregoing descriptions, the presence of the buffer layer 520 can significantly reduce the speed and impact force when the fluid materials of the second set of target fluid materials 610 (or 1010) reaches the bottom of the beverage container 102. Accordingly, forming the buffer layer 520 within the beverage container 102 first can effectively prevent fluid materials having greater density (e.g., various syrups, jams, seasoning sauces, or the like) from sticking on the bottom of the beverage container 102 and consequently being difficult to mix well with other fluid materials.

In this way, it can prevent a part of materials of the second set of target fluid materials 610 (or 1010) from depositing on a bottom of the beverage container 102 and thereby disturbing the color of the second target fluid layer 720 to be formed in the subsequent stage.

From one aspect, the presence of the aforementioned buffer layer 520 can significantly increase the mixing uniformity of the second set of target fluid materials 610 (or

1010) within the beverage container 102, and manually stirring or utilizing other mixers for stirring is no longer required.

From another aspect, the presence of the aforementioned buffer layer 520 also prevents the color of some fluid layers of the layered drink from having unexpected change and consequently causing negative impact on the visual effect of the layered drink.

Comparing with the unideal layered drink making method, many advantages of the layered drink making method adopted by the aforementioned automated beverage preparation apparatus 100 would be easier to understand.

Figure 13:
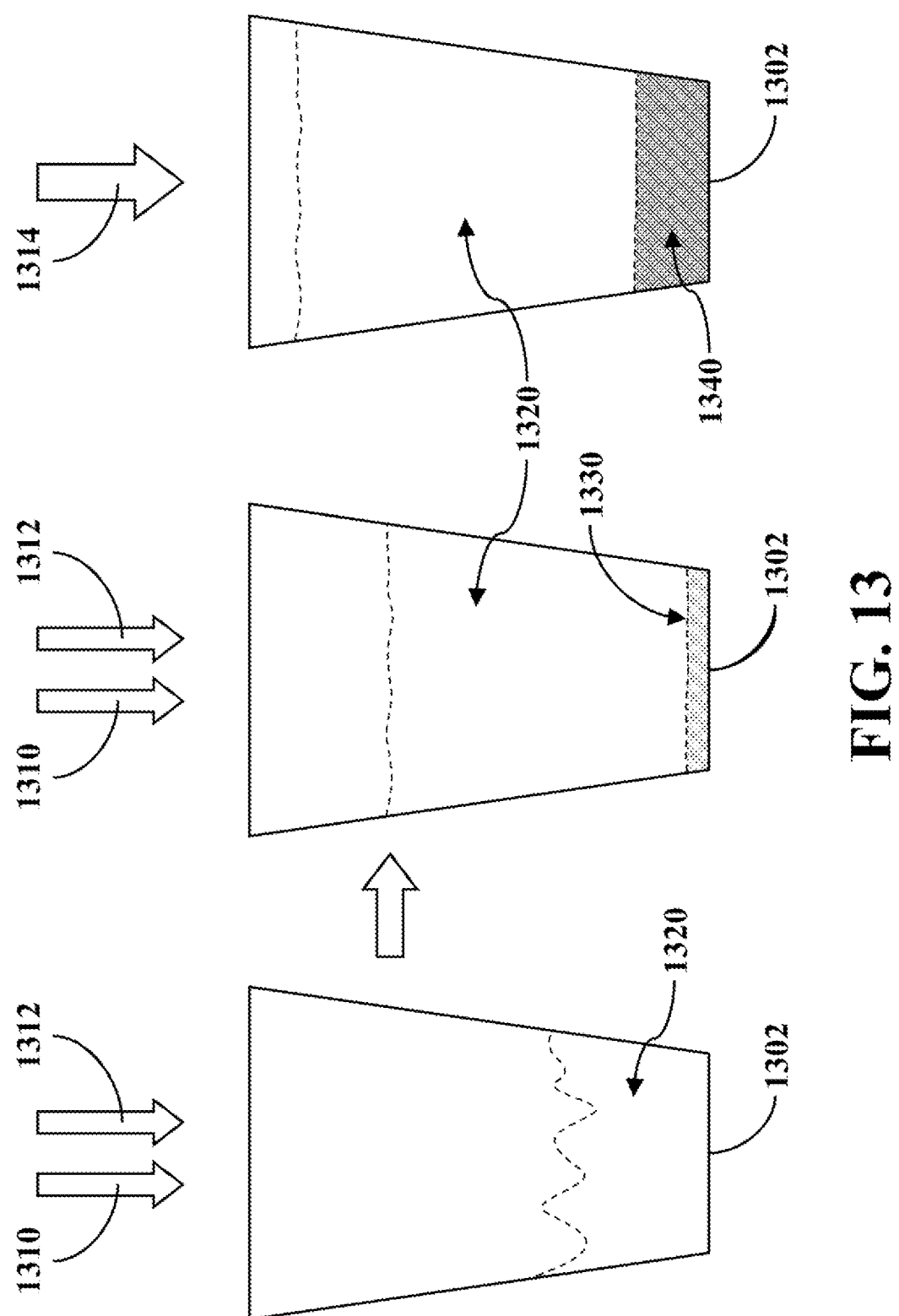
FIG. 13 shows a simplified schematic diagram of an unideal making operation of making a layered drink.
Figure 14:
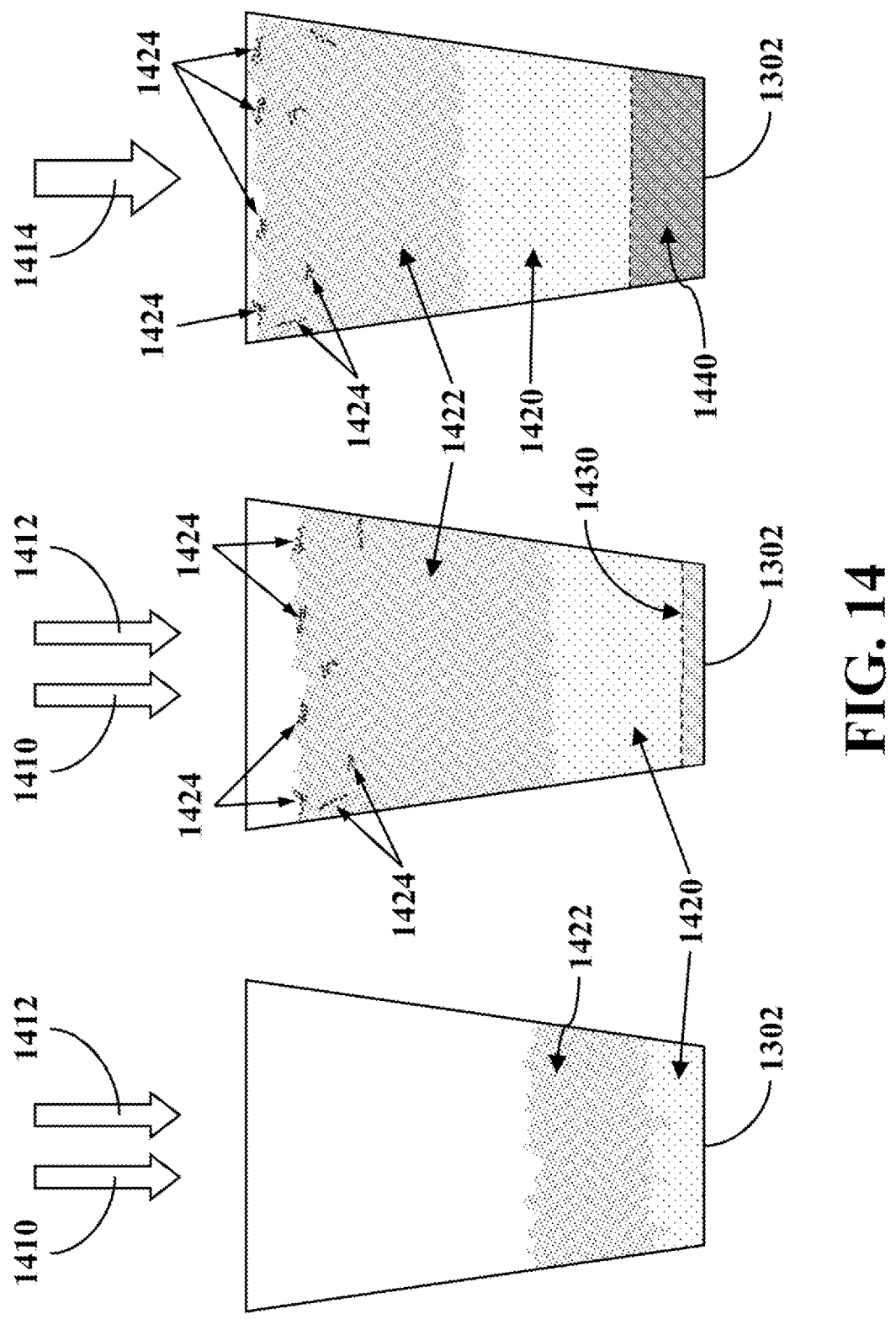
FIG. 14 shows a simplified schematic diagram of another unideal making operation of making a layered drink.

Therefore, unideal making methods of layered drink will be briefly described in the following by reference to FIG. 13 and FIG. 14. FIG. 13 shows a simplified schematic diagram of an unideal making operation of making a layered drink. FIG. 14 shows a simplified schematic diagram of another unideal making operation of making a layered drink.

As shown in FIG. 13, one of the unideal methods for making layered drink is adding a material having a greater density (e.g., the first-color syrup 1310) and another material having a lower density (e.g., the water 1312) into a beverage container 1302 at the same time to mix, so as to form a mixed liquid layer 1320. However, since the first-color syrup 1310 having the greater density will directly touch the bottom of the beverage container 1302 during the process in which the first-color syrup 1310 falls into the beverage container 1302, it is highly likely to cause a part of the first-color syrup 1310 to stick on the bottom of the beverage container 1302 and to form a layer of residual syrup 1330, and consequently being difficult to thoroughly mix well with the water 1312.

In this situation, if the mixed liquid layer 1320 and the residual syrup 1330 within the beverage container 1302 are not fully stirred manually or by utilizing other mixers prior to adding another material having a greater density (e.g., the second-color syrup 1314) into the beverage container 1302, the color of the second-color syrup 1314 which is supposed to sink beneath the mixed liquid layer 1320 may be disturbed by the color of the residual syrup 1330 which previously deposits on the bottom of the beverage container 1302, and thereby forming an undesired color layer 1340 having an undesired color. Such a result would obviously cause negative impact on the visual effect of the layered drink within the beverage container 1302, and probably even arouse the consumer's resentment.

As shown in FIG. 14, another unideal method for making layered drink is adding a material having a greater density (e.g., the first-color syrup 1410) and another aerated material having a lower density (e.g., the sparkling water 1412) into a beverage container 1302 at the same time to mix, so as to form an aerated mixed liquid layer 1420, along with a bubble layer 1422 above the aerated mixed liquid layer 1420.

However, since the first-color syrup 1410 having the greater density will directly touch the bottom of the beverage container 1302 during the process in which the first-color syrup 1410 falls into the beverage container 1302, it is highly likely to cause a part of the first-color syrup 1410 to stick on the bottom of the beverage container 1302 and to form a layer of the residual syrup 1430, and consequently being difficult to mix well with the sparkling water 1412.

In this situation, if the liquids within the beverage container 1302 are not well stirred manually or by utilizing other mixers prior to adding another material having a greater density (e.g., the second-color syrup 1414) into the beverage container 1302, the color of the second-color syrup 1414 which is supposed to sink beneath the aerated mixed liquid layer 1420 may be disturbed by the color of the residual syrup 1430 which previously deposits on the bottom of the beverage container 1302, and thereby forming an undesired color layer 1440 having an undesired color. Similarly, such a result would cause negative impact on the visual effect of the layered drink within the beverage container 1302, and probably even arouse the consumer's resentment.

In addition, as shown in FIG. 14, the method of adding the first-color syrup 1410 and the sparkling water 1412 into the beverage container 1302 at the same time further causes the thickness of the bubble layer 1422 within the beverage container 1302 to be much greater than that of the situation described in the aforementioned FIG. 10 through FIG. 12. This situation means that the carbon dioxide of the aerated mixed liquid layer 1420 is escaping rapidly. For a sparkling drink, the faster a rate at which the carbon dioxide dissipates from the drink, the shorter the duration this sparkling drink can retain good taste, and it also means that the tasting period of this sparkling drink is shorter.

Moreover, the method of adding the first-color syrup 1410 and the sparkling water 1412 into the beverage container 1302 at the same time also easily causes many bubbles sticked with syrup 1424 to appear within the bubble layer 1422. The bubbles sticked with syrup 1424 usually appear randomly and in varying quantities. Since in normal situations the first-color syrup 1410 added into the beverage container 1302 together with the sparkling water 1412 usually has a distinct color, the bubbles sticked with syrup 1424 that appear in the bubble layer 1422 often have an obvious color difference from the bubble layer 1422 itself. Such a result will make the bubble layer 1422 within the beverage container 1302 look noticeably dirty, which not only causes negative impact on the visual effect of the layered drink within the beverage container 1302, but may also cause some consumers to feel psychologically uncomfortable.

As can be appreciated from the foregoing descriptions, comparing with the unideal making methods of layered drink shown in FIG. 13 and FIG. 14, the aforementioned layered drink making method of FIG. 4 adopted by the automated beverage preparation apparatus 100 has many significant technical advantages.

Firstly, forming the buffer layer 520 within the beverage container 102 in advance can significantly reduce the speed and impact force of the fluid materials of the second set of target fluid materials 610 (or 1010) when they reach the bottom of the beverage container 102. Such approach can effectively prevent a part of fluid materials of the second set of target fluid materials 610 (or 1010) (e.g., various syrups, jams, seasoning sauces, or the like) from sticking on the bottom of the beverage container 102 and consequently being difficult to mix well with other fluid materials.

Secondarily, since the presence of the buffer layer 520 can prevent a part of materials of the second set of target fluid materials 610 (or 1010) from depositing on the bottom of the beverage container 102, it can also prevent the color of some fluid layers (e.g., the aforementioned second target fluid layer 720) of the layered drink from being disturbed and thereby having unexpected change.

In addition, since the presence of the buffer layer 520 can significantly increase the mixing uniformity of the second set of target fluid materials 610 (or 1010) within the beverage container 102, therefore manually stirring or utilizing other mixers for stirring the second set of target fluid materials 610 (or 1010) within the beverage container 102 is no longer required. Accordingly, by adopting the method shown in FIG. 4 to make layered drink, not only manual labor time can be saved, but also the need for any mixers is eliminated. Therefore, it can effectively reduce the volume of the automated beverage preparation apparatus 100 as well as the space required and the weight of the automated beverage preparation apparatus 100.

On the other hand, comparing with the unideal making operation of making a sparkling layered drink shown in FIG. 14, the method that the automated beverage preparation apparatus 100 first forms the buffer layer 520 within the beverage container 102 further effectively slows down the rate at which the carbon dioxide dissipates from the second set of target fluid materials 1010 within the beverage container 102, thereby it can extend the duration of good taste for the sparkling drink.

Furthermore, as shown in FIG. 9 through FIG. 12, when the automated beverage preparation apparatus 100 adopts the method of FIG. 4 to make the sparkling layered drink, it can further prevent bubbles sticked with syrup from appearing in the bubble layer 1022 within the beverage container 102, so it will not make the bubble layer 1022 appear dirty.

Figure 16:
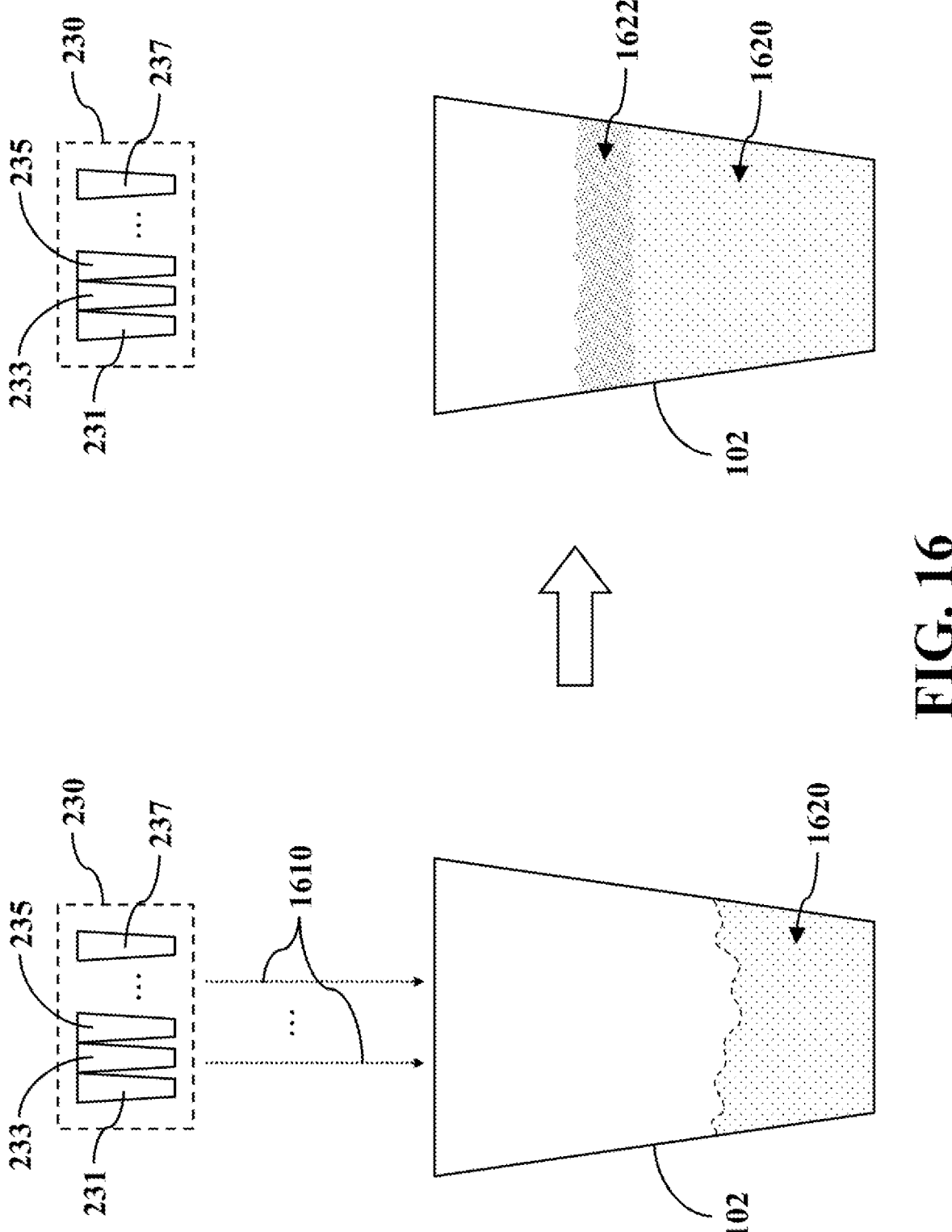
FIGS. 16~18 show simplified schematic diagrams of a sparkling drink making operation conducted by the automated beverage preparation apparatus according to one embodiment of the present disclosure.
Figure 17:
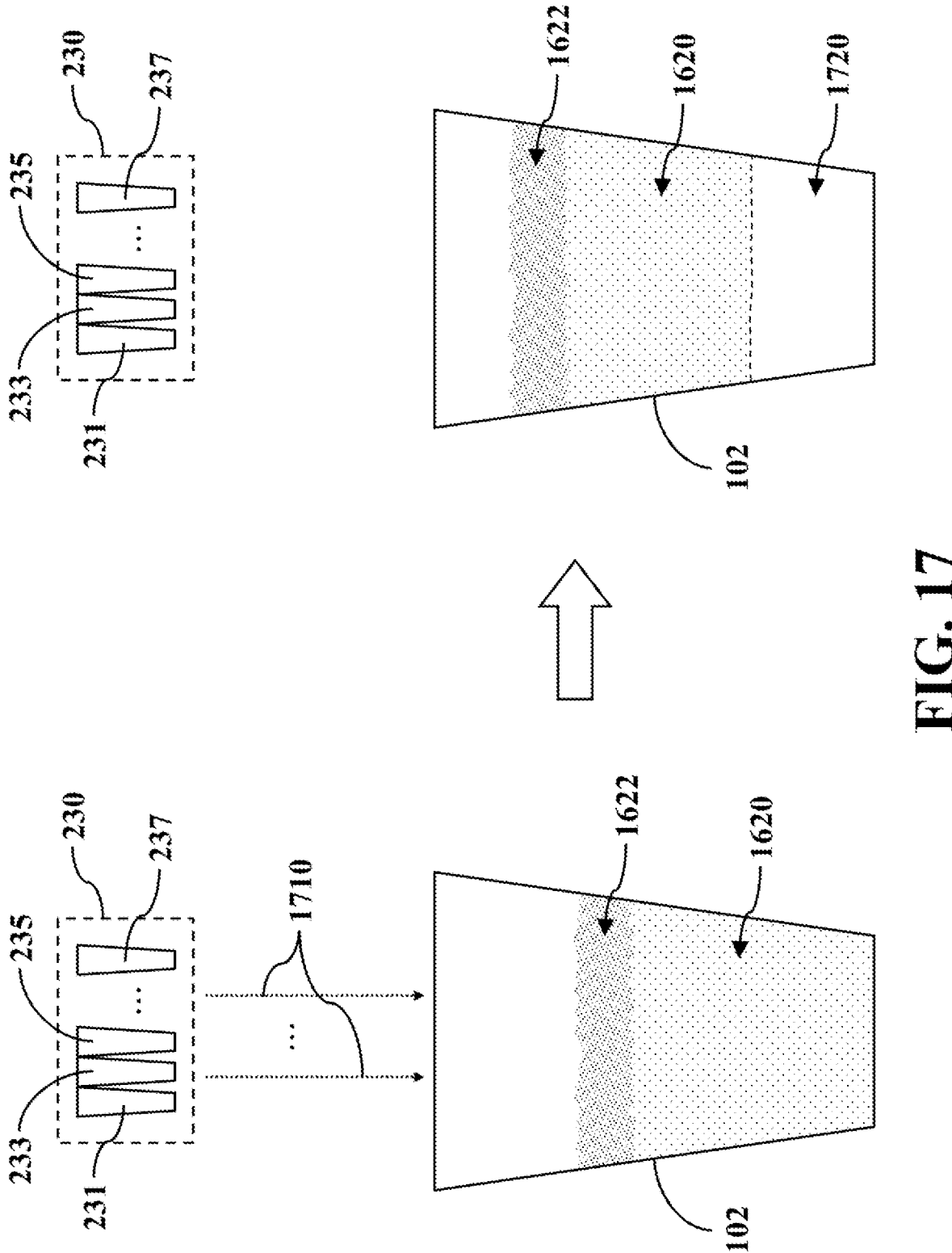
Figure 18:
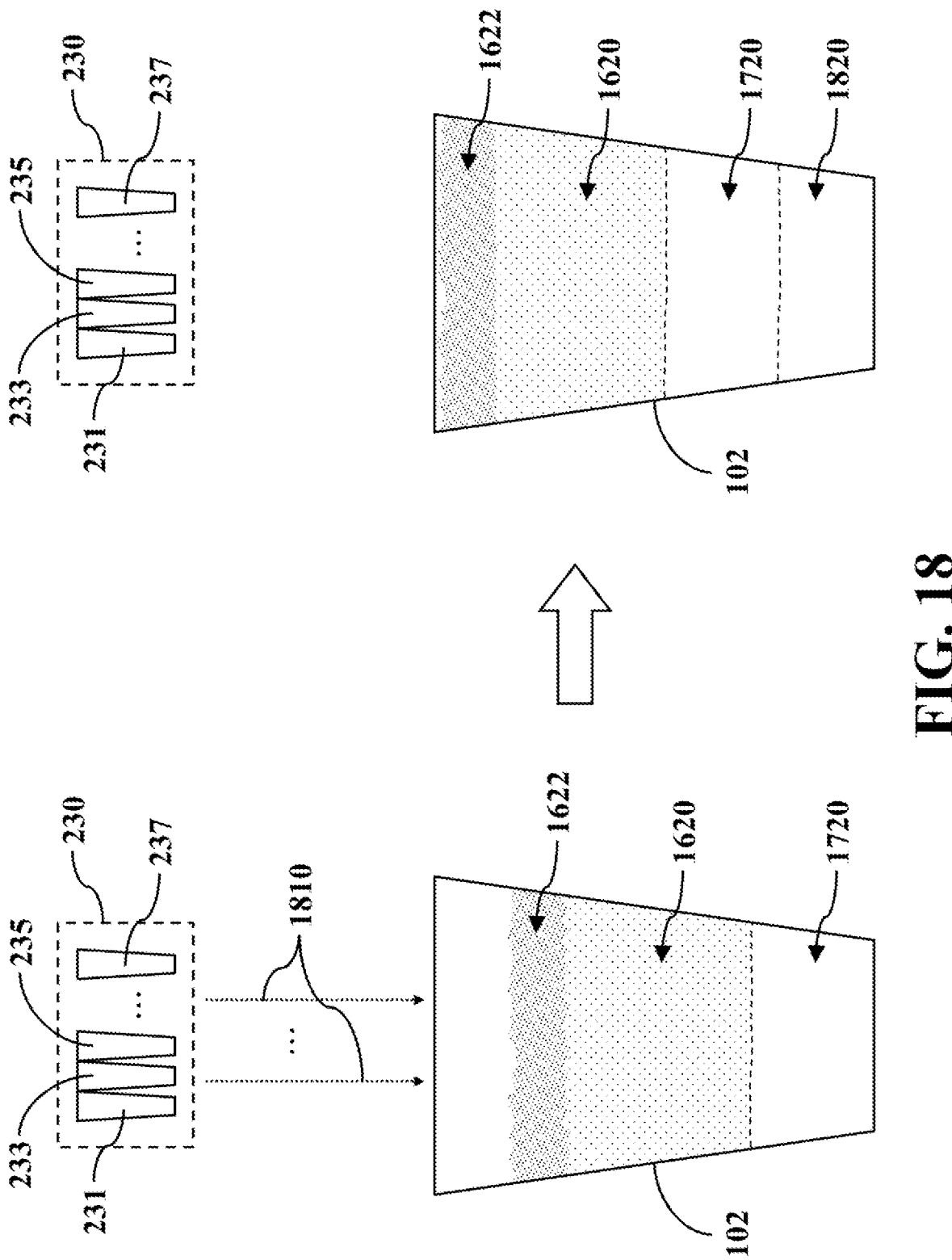

The operations of making a sparkling drink adopted by the automated beverage preparation apparatus 100 will be further described in the following by reference to FIG. 15 through FIG. 18. FIG. 15 shows a simplified flowchart of a sparkling drink preparing method adopted by the automated beverage preparation apparatus 100 according to one embodiment of the present disclosure. FIGS. 16~18 show simplified schematic diagrams of a sparkling drink making operation conducted by the automated beverage preparation apparatus 100 according to one embodiment of the present disclosure.

As described previously, when the control command generated by the user control interface 110 requests the automated beverage preparation apparatus 100 to prepare a predetermined sparkling drink, the processing circuit 240 may adopt a sparkling drink preparing method shown in FIG. 15 to utilize the control signal to instruct the pump control circuit 250 to conduct a sparkling drink making operation.

In this situation, as shown in FIG. 16, the pump control circuit 250 may perform the operation 1510 of FIG. 15 under control of the processing circuit 240 to actuate a first predetermined pump subset in the multiple pumps 221, 223, 225, 227 to cause the fluid output device 230 to dispense a first set of predetermined fluid materials 1610 having bubbles and having a density less than 120% of the density of water, so as to form an aerated liquid layer 1620 within the beverage container 102. In this situation, a bubble layer 1622 will be formed above the aerated liquid layer 1620. In normal situation, the bubble layer 1622 primarily comprises carbon dioxide.

Depending on the kinds of fluid materials required for forming the aerated liquid layer 1620, the aforementioned first set of predetermined fluid materials 1610 may be a single kind of sparkling fluid material (e.g., various aerating water, sparkling water, beer, soft drink, or carbonated beverage, or the like), or may be two or more than two kinds of fluid materials (and at least one of which is a sparkling fluid material). Accordingly, the aforementioned first predetermined pump subset may be a single pump, or may be two or more than two pumps.

In the operation of 1510, in order to prevent fluid materials having greater density from depositing on the bottom of the beverage container 102, the pump control circuit 250 does not actuate other pumps than the first predetermined pump subset to cause the fluid output device 230 to not simultaneously dispense other fluid material having a density greater than 125% of the density of water to the beverage container 102.

When the fluid output device 230 dispenses the first set of predetermined fluid materials 1610 for a first predetermined amount or a first predetermined time, the processing circuit 240 may instruct the pump control circuit 250 to perform the operation 1520 to stop actuating the first predetermined pump subset to cause the fluid output device 230 to stop dispensing the first set of predetermined fluid materials 1610. The pump control circuit 250 may stop actuating all pumps of the first predetermined pump subset at the same time, or alternatively the pump control circuit 250 may first stop actuating a part of the pumps of the first predetermined pump subset and then stop actuating other pumps of the first predetermined pump subset after a short period of time. In other words, the fluid output device 230 may stop dispensing all fluid materials of the first set of predetermined fluid materials 1610 at the same time, or the fluid output device 230 may first stop dispensing a part of the fluid materials of the first set of predetermined fluid materials 1610 and then stop dispensing other fluid materials of the first set of predetermined fluid materials 1610 after a short period of time.

As shown in FIG. 17, after forming the aerated liquid layer 1620, the processing circuit 240 may instruct the pump control circuit 250 to perform the operation 1530 to actuate a second predetermined pump subset in the multiple pumps 221, 223, 225, 227, so as to cause the fluid output device 230 to dispense a second set of predetermined fluid materials 1710 having a color different from the color of the aerated liquid layer 1620 and having a density greater than a density of the aerated liquid layer 1620, thereby forming a first predetermined fluid layer 1720 having a color different from the color of the aerated liquid layer 1620 beneath the aerated liquid layer 1620.

Depending on the kinds of fluid materials required for creating the color of the first predetermined fluid layer 1720, the aforementioned second set of predetermined fluid materials 1710 may be a single kind of fluid material having a predetermined color, or may be two or more than two kinds of fluid materials having different colors. Accordingly, the aforementioned second predetermined pump subset may be a single pump, or may be two or more than two pumps.

Since the density of the second set of predetermined fluid materials 1710 is greater than the density of the aerated liquid layer 1620, the first predetermined fluid layer 1720 formed from the second set of predetermined fluid materials 1710 will naturally sink beneath the aerated liquid layer 1620 and has a color different from the color of the aerated liquid layer 1620.

During the process of the newly-added second set of predetermined fluid materials 1710 sinking down, a part of the materials of the second set of predetermined fluid materials 1710 will mix into the aerated liquid layer 1620 due to diffusion. Accordingly, in some applications, the newly-added second set of predetermined fluid materials 1710 may be utilized to adjust the color of the aerated liquid layer 1620 within the beverage container 102.

When the fluid output device 230 dispenses the second set of predetermined fluid materials 1710 for a second predetermined amount or a second predetermined time, the processing circuit 240 may instruct the pump control circuit 250 to perform the operation 1540 to stop actuating the second predetermined pump subset to cause the fluid output device 230 to stop dispensing the second set of predetermined fluid materials 1710. Similarly, the pump control circuit 250 may stop actuating all pumps of the second predetermined pump subset at the same time, or alternatively the pump control circuit 250 may first stop actuating a part of the pumps of the second predetermined pump subset and then stop actuating other pumps of the second predetermined pump subset after a short period of time. In other words, the fluid output device 230 may stop dispensing all fluid materials of the second set of predetermined fluid materials 1710 at the same time, or the fluid output device 230 may first stop dispensing a part of the fluid materials of the second set of predetermined fluid materials 1710 and then stop dispensing other fluid materials of the second set of predetermined fluid materials 1710 after a short period of time.

In this way, the automated beverage preparation apparatus 100 is enabled to complete a preparing procedure of a basic sparkling drink having two different color layers.

If it is desired that the sparkling drink within the beverage container 102 has more color layers, the processing circuit 240 may further instruct the pump control circuit 250 to repeat operations similar to that in the aforementioned operation 1530 and operation 1540 to actuate different pump subset to cause the fluid output device 230 to dispense another set of predetermined fluid materials.

For example, as shown in FIG. 18, after forming the first predetermined fluid layer 1720, the processing circuit 240 may instruct the pump control circuit 250 to perform the operation 1550 of FIG. 15 to actuate a third predetermined pump subset in the multiple pumps 221, 223, 225, 227, so as to cause the fluid output device 230 to dispense a third set of predetermined fluid materials 1810 having a color different from the color of the first predetermined fluid layer 1720 and having a density greater than a density of the first predetermined fluid layer 1720, thereby forming a second predetermined fluid layer 1820 having a color different from the color of the first predetermined fluid layer 1720 beneath the first predetermined fluid layer 1720.

Depending on the kinds of fluid materials required for creating the color of the second predetermined fluid layer 1820, the aforementioned third set of predetermined fluid materials 1810 may be a single kind of fluid material having a predetermined color, or may be two or more than two kinds of fluid materials having different colors. Accordingly, the aforementioned third predetermined pump subset may be a single pump, or may be two or more than two pumps.

Since the density of the third set of predetermined fluid materials 1810 is greater than the density of the first predetermined fluid layer 1720, the second predetermined fluid layer 1820 formed from the third set of predetermined fluid materials 1810 will naturally sink beneath the first predetermined fluid layer 1720 and has a color different from the color of the first predetermined fluid layer 1720.

During the process of the newly-added third set of predetermined fluid materials 1810 sinking down, a part of the materials of the third set of predetermined fluid materials 1810 will mix into the aerated liquid layer 1620 and/or the first predetermined fluid layer 1720 due to diffusion. Accordingly, in some applications, the newly-added third set of predetermined fluid materials 1810 may be utilized to adjust the color of the aerated liquid layer 1620 and/or the first predetermined fluid layer 1720.

When the fluid output device 230 dispenses the third set of predetermined fluid materials 1810 for a third predetermined amount or a third predetermined time, the processing circuit 240 may instruct the pump control circuit 250 to perform the operation 1560 to stop actuating the third predetermined pump subset to cause the fluid output device 230 to stop dispensing the third set of predetermined fluid materials 1810. Similarly, the pump control circuit 250 may stop actuating all pumps of the third predetermined pump subset at the same time, or alternatively the pump control circuit 250 may first stop actuating a part of the pumps of the third predetermined pump subset and then stop actuating other pumps of the third predetermined pump subset after a short period of time. In other words, the fluid output device 230 may stop dispensing all fluid materials of the third set of predetermined fluid materials 1810 at the same time, or the fluid output device 230 may first stop dispensing a part of the fluid materials of the third set of predetermined fluid materials 1810 and then stop dispensing other fluid materials of the third set of predetermined fluid materials 1810 after a short period of time.

In this way, the automated beverage preparation apparatus 100 is enabled to complete a preparing procedure of a sparkling drink having three different color layers. If it is desired to have more color layers in the sparkling drink within the beverage container 102, the processing circuit 240 may further instruct the pump control circuit 250 to repeat operations similar to that in the aforementioned operation 1550 and operation 1560 to actuate different pump subset to cause the fluid output device 230 to dispense another set of predetermined fluid materials having a color different from the color of the bottommost fluid layer and having a density greater than the density of the bottommost fluid layer, so as to additionally form another predetermined fluid layer having a different color from the color of the currently bottommost fluid layer beneath the currently bottommost fluid layer.

Comparing with the unideal sparkling drink making method, many advantages of the sparkling drink making method adopted by the aforementioned automated beverage preparation apparatus 100 would be easier to understand.

Figure 19:
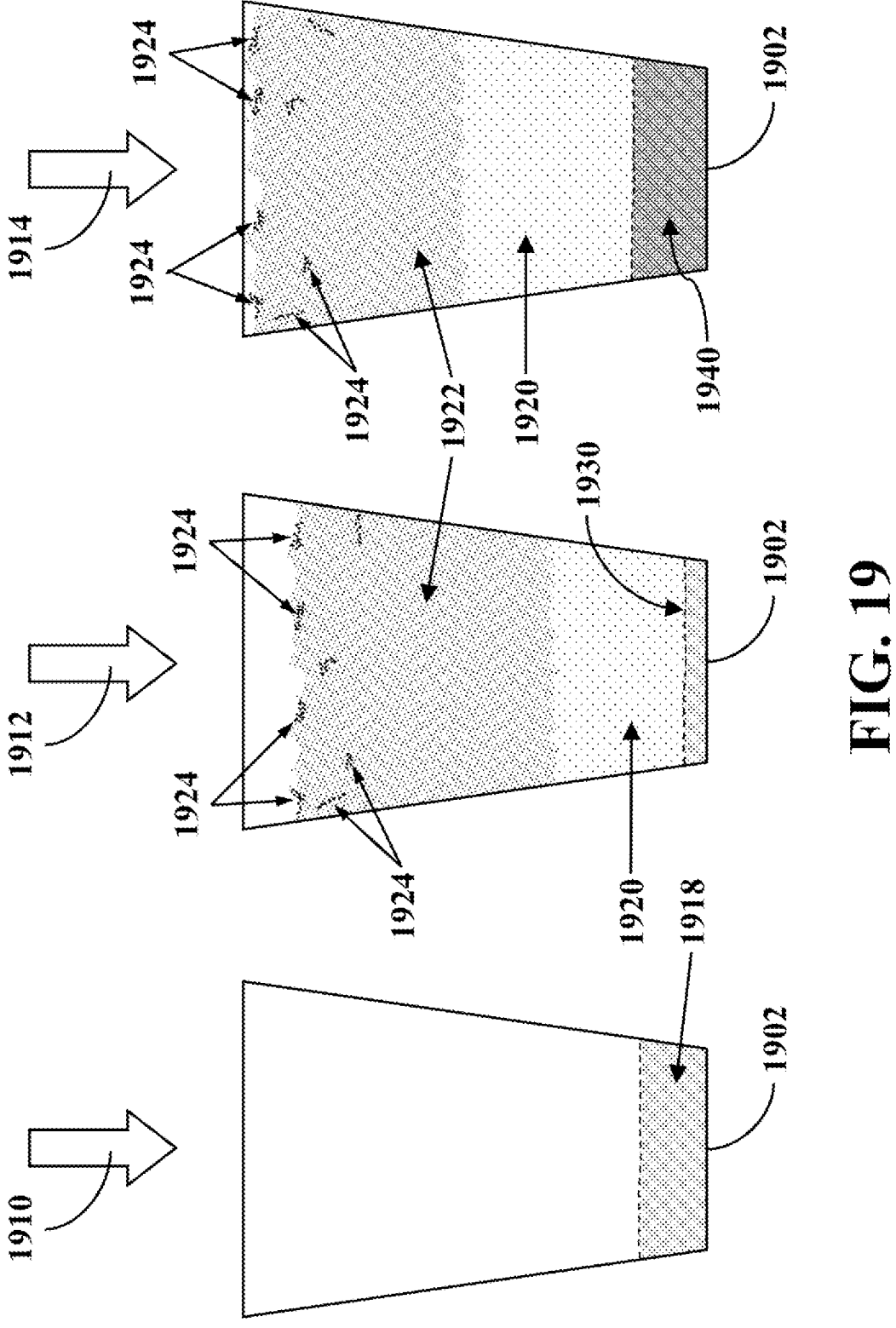
FIG. 19 shows a simplified schematic diagram of an unideal making operation of making a sparkling drink.

Therefore, an unideal making method of sparkling drink will be briefly described in the following by reference to FIG. 19. FIG. 19 shows a simplified schematic diagram of an unideal making operation of making a sparkling drink.

As shown in FIG. 19, unideal method for making sparkling drink is to first add a material having a greater density (e.g., the first-color syrup 1910) for a predetermined amount into a beverage container 1902 and then add another aerated material having a lower density (e.g., the sparkling water 1912) into a beverage container 1902, so as to form an aerated mixed liquid layer 1920, along with a bubble layer 1922 above the aerated mixed liquid layer 1920.

However, since the first-color syrup 1910 having the greater density is added into the beverage container 1902 first, the first-color syrup 1910 will directly touch the bottom of the beverage container 1902. Therefore, a part of the first-color syrup 1910 is highly likely to stick on the bottom of the beverage container 1902 and form a layer of the residual syrup 1930, and consequently being difficult to thoroughly mix well with the sparkling water 1912.

In this situation, if the first-color syrup 1910 and the sparkling water 1912 within the beverage container 1902 are not well stirred manually or by utilizing other mixers prior to adding another material having a greater density (e.g., the second-color syrup 1914) into the beverage container 1902, the color of the second-color syrup 1914 which is supposed to sink beneath the aerated mixed liquid layer 1920 may be disturbed by the color of the residual syrup 1930 which previously deposits on the bottom of the beverage container 1902, and thereby forming an undesired color layer 1940 having an undesired color. Such a result would cause negative impact on the visual effect of the sparkling drink within the beverage container 1902, and probably even arouse the consumer's resentment.

In addition, as shown in FIG. 19, the method of adding the first-color syrup 1910 first and then adding the sparkling water 1912 into the beverage container 1902 further causes the thickness of the bubble layer 1922 within the beverage container 1902 to be much greater than that of the situation described in the aforementioned FIG. 16 through FIG. 18. This situation means that the carbon dioxide of the aerated mixed liquid layer 1920 is escaping rapidly. For a sparkling drink, the faster the rate at which the carbon dioxide dissipates from the drink, the shorter the duration this sparkling drink can retain good taste, and it also means that the tasting period of this sparkling drink is shorter.

Moreover, the method of adding the first-color syrup 1910 first and then adding the sparkling water 1912 into the beverage container 1902 further results in having many bubbles sticked with syrup 1924 appearing in the bubble layer 1922. The bubbles sticked with syrup 1924 usually appear randomly and in varying quantities. Since in normal situations the first-color syrup 1910 added into the beverage container 1902 usually has a distinct color, the bubbles sticked with syrup 1924 that appear in the bubble layer 1922 often have an obvious color difference from the bubble layer 1922 itself. Such a result will make the bubble layer 1922 within the beverage container 1902 look noticeably dirty, which not only causes negative impact on the visual effect of the sparkling drink within the beverage container 1902, but may also cause some consumers to feel psychologically uncomfortable.

As can be appreciated from the foregoing descriptions, comparing with the unideal making method of sparkling drink shown in FIG. 19, the aforementioned sparkling drink making method of FIG. 15 adopted by the automated beverage preparation apparatus 100 has many significant technical advantages.

Firstly, the automated beverage preparation apparatus 100 can effectively slow down the rate at which the carbon dioxide dissipates from the first set of predetermined fluid materials 1610 within the beverage container 102 by adding the first set of predetermined fluid materials 1610 having bubbles into the beverage container 102 first and then adding the second set of predetermined fluid materials 1710, and thus extend the duration of good taste for the sparkling drink.

Furthermore, as shown in FIG. 16 through FIG. 18, when the automated beverage preparation apparatus 100 adopts the method of FIG. 15 to make the sparkling drink, it can further prevent bubbles sticked with syrup from appearing in the bubble layer 1622 within the beverage container 102, so it will not make the bubble layer 1622 appear dirty.

Accordingly, the sparkling drink made by the automated beverage preparation apparatus 100 by adopting the method of FIG. 15 not only has good visual effects but also has longer tasting period.

Please note that the quantity, shape, or position of some components in the aforementioned automated beverage preparation apparatus 100 may be modified depending on the requirement of practical applications, rather than being restricted to the pattern shown in the aforementioned embodiments.

For example, the quantity of pumps, fluid outlets, material containers, and/or flowmeters arranged in the automated beverage preparation apparatus 100 may be increased as needed.

For another example, in some embodiments, appropriate damper devices may be additionally arranged in some aforementioned material transmission paths, so as to stabilize the material output volume and/or the material output speed of respective fluid outlets.

For another example, in some embodiments, the function key set 114 in the aforementioned user control interface may be omitted.

For another example, in some embodiments, the processing circuit 240 or the pump control circuit 250 may calculate an output amount of the fluid materials of a fluid outlet based on the operation time period of a specific pump operates or based on a time length during which the corresponding fluid outlet outputs materials. In this situation, a part of or all of the aforementioned flowmeters 361~367 may be omitted.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to encompass any indirect or direct connection. Accordingly, if this disclosure mentioned that a first circuit is coupled with a second circuit, it means that the first circuit may be directly or indirectly connected to the second circuit through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Throughout the description and claims, the term "element" contains the concept of component, layer, or region.

In the drawings, the size and relative sizes of some elements may be exaggerated or simplified for clarity. Accordingly, unless the context clearly specifies, the shape, size, relative size, and relative position of each element in the drawings are illustrated merely for clarity, and not intended to be used to restrict the claim scope.

For the purpose of explanatory convenience in the specification, spatially relative terms, such as "on," "above," "below," "beneath," "higher," "lower," "upward," "downward," "forward," "backward," and the like, may be used herein to describe the function of a particular element or to describe the relationship of one element to another element(s) as illustrated in the drawings. It will be understood that the spatially relative terms are intended to encompass different orientations of the element in use, in operations, or in assembly in addition to the orientation depicted in the drawings. For example, if the element in the drawings is turned over, elements described as "on" or "above" other elements would then be oriented "under" or "beneath" the other elements. Thus, the exemplary term "beneath" can encompass both an orientation of above and beneath. For another example, if the element in the drawings is reversed, the action described as "forward" may become "backward," and the action described as "backward" may become "forward." Thus, the exemplary description "forward" can encompass both an orientation of forward and backward.

Throughout the description and claims, it will be understood that when a component is referred to as being "positioned on," "positioned above," "connected to," "engaged with," or "coupled with" another component, it can be directly on, directly connected to, or directly engaged with the other component, or intervening component may be present. In contrast, when a component is referred to as being "directly on," "directly connected to," or "directly engaged with" another component, there are no intervening components present.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. An automated beverage preparation apparatus (100), comprising:

multiple pumps (221, 223, 225, 227), respectively utilized for extracting multiple fluid materials (301, 303, 305, 307) stored in multiple material containers (271, 273, 275, 277), and utilized for pushing corresponding fluid materials to move forward;

a fluid output device (230), comprising multiple fluid outlets (231, 233, 235, 237), wherein the multiple fluid outlets (231, 233, 235, 237) are respectively coupled with the multiple pumps (221, 223, 225, 227), and are respectively utilized for dispensing a corresponding fluid material to a beverage container (102);

a user control interface (110), arranged to operably generate a control command according to a user's manipulation;

a processing circuit (240), coupled with the user control interface (110), and arranged to operably generate a corresponding control signal according to the control command; and a pump control circuit (250), coupled with the processing circuit (240) and the multiple pumps (221, 223, 225, 227), and arranged to operably control the multiple pumps (221, 223, 225, 227) according to the control signal;

wherein when the control command requests the automated beverage preparation apparatus (100) to prepare a predetermined layered drink, the pump control circuit (250) conducts a layered drink making operation under control of the processing circuit (240) to cause the fluid output device (230) to dispense different fluid materials to the beverage container (102), so as to automatically form a layered drink having at least two color layers within the beverage container (102);

wherein the layered drink making operation comprises:

actuating a first target pump subset in the multiple pumps (221, 223, 225, 227) to cause the fluid output device (230) to dispense a first set of target fluid materials (510) having a density which is less than 110% of the density of water, so as to form a buffer layer (520) within the beverage container (102);

after forming the buffer layer (520), actuating a second target pump subset to cause the fluid output device (230) to dispense a second set of target fluid materials (610; 1010) comprising at least two fluid materials, so that the second set of target fluid materials (610; 1010) and the buffer layer (520) are mixed to form a first target fluid layer (620; 1020) within the beverage container (102); and after forming the first target fluid layer (620; 1020), actuating a third target pump subset to cause the fluid output device (230) to dispense a third set of target fluid materials (710) having a color different from a color of the first target fluid layer (620; 1020) and having a density greater than a density of the first target fluid layer (620; 1020), so as to form a second target fluid layer (720) having a color different from the color of the first target fluid layer (620; 1020) beneath the first target fluid layer (620; 1020).

2. The automated beverage preparation apparatus (100) of claim 1, wherein the first set of target fluid materials (510) comprises: a drinking water, an aerating water, a sparkling water, a tea, a beer, a coffee, a soft drink, a carbonated beverage, a fruit juice, a vegetable juice, a malt wort, a liquid material comprising animal milk, a liquid material comprising alcohol, a liquid material comprising sugar, a liquid material comprising salt, a liquid material comprising vinegar, a liquid material comprising cocoa, a liquid material comprising lactic acid, a liquid material comprising plant extract, or a liquid material comprising protein.

3. The automated beverage preparation apparatus (100) of claim 1, wherein the buffer layer (520) has a thickness between 0.5 centimeter and 7 centimeters.

4. The automated beverage preparation apparatus (100) of claim 1, wherein during the operation of forming the buffer layer (520), the pump control circuit (250) does not actuate other pumps than the first target pump subset to cause the fluid output device (230) to not simultaneously dispense other fluid material having a density greater than 125% of the density of water to the beverage container (102).

5. The automated beverage preparation apparatus (100) of claim 1, wherein the layered drink making operation further comprises:

when the fluid output device (230) dispenses the first set of target fluid materials (510) for a first target amount or a first target time, stopping actuating the first target pump subset to cause the fluid output device (230) to stop dispensing the first set of target fluid materials (510) to reduce a fluctuation extent of the buffer layer (520).

6. The automated beverage preparation apparatus (100) of claim 1, wherein the layered drink making operation further comprises:

after forming the second target fluid layer (720), actuating a fourth target pump subset to cause the fluid output device (230) to dispense a fourth set of target fluid materials (810) having a density greater than a density of the second target fluid layer (720), so as to form a third target fluid layer (820) having a color different from the color of the second target fluid layer (720) beneath the second target fluid layer (720).

7. The automated beverage preparation apparatus (100) of claim 1, wherein the fluid output device (230) dispenses the second set of target fluid materials (610; 1010) to the beverage container (102) only after the buffer layer (520) is formed within the beverage container (102), so as to prevent the fluid materials within the beverage container (102) not being mixed evenly, and to prevent a part of materials of the second set of target fluid materials (610; 1010) from depositing on a bottom of the beverage container (102) and thereby disturbing the color of the second target fluid layer (720).

8. The automated beverage preparation apparatus (100) of claim 1, wherein the second set of target fluid materials (610; 1010) comprises: an aerating water, a sparkling water, a beer, a soft drink, or a carbonated beverage.

9. The automated beverage preparation apparatus (100) of claim 8, wherein a bubble layer (1022) is formed above the first target fluid layer (620; 1020);

wherein the fluid output device (230) dispenses the second set of target fluid materials (610; 1010) to the beverage container (102) only after the buffer layer (520) is formed within the beverage container (102), so as to slow down a rate at which carbon dioxide dissipates from the first target fluid layer (620; 1020), and to prevent bubbles sticked with syrup (1424) from appearing in the bubble layer (1022).

10. The automated beverage preparation apparatus (100) of claim 1, wherein when the control command requests the automated beverage preparation apparatus (100) to prepare a predetermined sparkling drink, the pump control circuit (250) conducts a sparkling drink making operation under control of the processing circuit (240) to cause the fluid output device (230) to dispense different fluid materials to the beverage container (102) in order, so as to automatically form a sparkling drink having a predetermined flavor within the beverage container (102).

11. The automated beverage preparation apparatus (100) of claim 10, wherein the sparkling drink making operation comprises:

actuating a first predetermined pump subset to cause the fluid output device (230) to dispense a first set of predetermined fluid materials (1610) having bubbles and having a density less than 120% of the density of water, so as to form an aerated liquid layer (1620).

12. The automated beverage preparation apparatus (100) of claim 11, wherein the first set of predetermined fluid materials (1610) comprises: an aerating water, a sparkling water, a beer, a soft drink, or a carbonated beverage.

13. The automated beverage preparation apparatus (100) of claim 11, wherein during the operation of forming the aerated liquid layer (1620), the pump control circuit (250) does not actuate other pumps than the first target pump subset to cause the fluid output device (230) to not simultaneously dispense other fluid material having a density greater than 125% of the density of water to the beverage container (102).

14. The automated beverage preparation apparatus (100) of claim 11, wherein the sparkling drink making operation further comprises:

after forming the aerated liquid layer (1620), actuating a second predetermined pump subset to cause the fluid output device (230) to dispense a second set of predetermined fluid materials (1710) having a color different from a color of the aerated liquid layer (1620) and having a density greater than a density of the aerated liquid layer (1620), so as to form a first predetermined fluid layer (1720) having a color different from the color of the aerated liquid layer (1620) beneath the aerated liquid layer (1620).

15. The automated beverage preparation apparatus (100) of claim 14, wherein the sparkling drink making operation further comprises:

utilizing the second set of predetermined fluid materials (1710) to change a color of the aerated liquid layer (1620) within the beverage container (102).

16. The automated beverage preparation apparatus (100) of claim 14, wherein the sparkling drink making operation further comprises:

after forming the first predetermined fluid layer (1720), actuating a third predetermined pump subset to cause the fluid output device (230) to dispense a third set of predetermined fluid materials (1810) having a density greater than a density of the first predetermined fluid layer (1720), so as to form a second predetermined fluid layer (1820) having a color different from a color of the first predetermined fluid layer (1720) beneath the first predetermined fluid layer (1720).

17. The automated beverage preparation apparatus (100) of claim 14, wherein a bubble layer (1622) is formed above the aerated liquid layer (1620);

wherein the fluid output device (230) dispenses the second set of predetermined fluid materials (1710) to the beverage container (102) only after dispensing the first set of predetermined fluid materials (1610), so as to slow down a rate at which carbon dioxide dissipates from the aerated liquid layer (1620), and to prevent bubbles sticked with syrup (1924) from appearing in the bubble layer (1622).

\* \* \* \* \*